US006415254B1

(12) United States Patent
Yasunaga et al.

(10) Patent No.: US 6,415,254 B1
(45) Date of Patent: Jul. 2, 2002

(54) SOUND ENCODER AND SOUND DECODER

(75) Inventors: Kazutoshi Yasunaga; Toshiyuki Morii, both of Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/319,933

(22) PCT Filed: Oct. 22, 1998

(86) PCT No.: PCT/JP98/04777

§ 371 (c)(1), (2), (4) Date: Jun. 18, 1999

(87) PCT Pub. No.: WO99/21174

PCT Pub. Date: Apr. 29, 1999

(30) Foreign Application Priority Data

Oct. 22, 1997 (JP) .............................................. 9-289412
Oct. 28, 1997 (JP) .............................................. 9-295130
Mar. 31, 1998 (JP) .............................................. 10-085717

(51) Int. Cl.[7] .......................... G01L 19/10; G01L 19/12
(52) U.S. Cl. ........................ 704/223; 704/222; 704/219
(58) Field of Search ................................ 704/222, 200, 704/219, 223, 230, 224, 220, 264, 266, 269

(56) References Cited

U.S. PATENT DOCUMENTS

| | | | | | |
|---|---|---|---|---|---|
| 4,868,867 | A | * | 9/1989 | Davidson et al. | 381/36 |
| 5,195,137 | A | * | 3/1993 | Swaminathan | 704/201 |
| 5,307,441 | A | * | 4/1994 | Tzeng | 704/222 |
| 5,734,790 | A | | 3/1998 | Taguchi | |
| 5,826,226 | A | * | 10/1998 | Ozawa | 704/223 |
| 5,963,896 | A | * | 10/1999 | Ozawa | 704/219 |
| 6,122,608 | A | * | 9/2000 | McCree | 704/219 |

FOREIGN PATENT DOCUMENTS

| | | |
|---|---|---|
| EP | 0778561 | 6/1997 |
| JP | 2280200 | 11/1990 |
| JP | 2282800 | 11/1990 |
| JP | 5108098 | 4/1993 |
| JP | 6202699 | 7/1994 |
| JP | 7-28497 | 1/1995 |
| JP | 8-8753 | 1/1996 |
| JP | 9-34498 | 2/1997 |
| JP | 9160596 | 6/1997 |
| JP | 10-63300 | 3/1998 |

OTHER PUBLICATIONS

Schroeder, M.R., et al., "Code Excited Linear Prediction (CELP): High Quality Speech At Very Low Bit Rates", Proc. ICASSP 1985, pp. 937–940.

Salami, R., et al., "8 K Bit/s ACELP Coding Of Speech With 10 MS Speech Frame: A Candidate For CCITT Standardization", ICASSP 1994, pp. II–97~II100, 1994.

Linde, Y., et al., "An Algorithm For Vector Quantizer Design", IEEE Transactions On Communications, vol. Com–28, No. 1, pp. 84–95, Jan. 1980.

(List continued on next page.)

*Primary Examiner*—Richemond Dorvil
(74) *Attorney, Agent, or Firm*—Greenblum & Bernstein, P.L.C.

(57) ABSTRACT

An excitation vector generator comprises a pulse vector generating section having N channels (N≧1) for generating pulse vectors, a storing section for storing M (M≧1)kinds of dispersion patterns every channel in accordance with N channels, a selecting section for selectively taking out a dispersion pattern from the storing section every channel, a dispersion section for performing a superimposing calculation of the extracted dispersion pattern and the generated pulse vectors every channel so as to generate N dispersion vectors, excitation vector generating section for generating an excitation vector from N dispersion vectors generated.

32 Claims, 14 Drawing Sheets

OTHER PUBLICATIONS

Gerso, I., et al., "Vector Sum Excited Linear Prediction (VSELP) Speech Coding At 8 KBPS", pp. 461–464, IEEE 1990.
IKEDO, J. et al., "Low Complexity CELP Speech Coder Using Orthogonalized Search Of Algebraic Code", p. 255 together with a partial English translation thereof.
An English language abstract of JP 2–280200.
An English language abstract of JP 2–280800.
An English language abstract of JP 9–160596.
An English language abstract of JP 8–008753.
An English language abstract of JP 10–063300.
An English language abstract of JP 7–028497.
An English language abstract of JP 5–108098.
An Englsih language abstract of JP 6–202699.
An English language abstract of JP 9–034498.

* cited by examiner

SOUND ENCODER AND SOUND DECODER

TECHNICAL FIELD

The present invention relates to a speech coder for efficiently coding speech information and a speech decoder for efficiently decoding the same.

BACKGROUND ART

A speech coding technique for efficiently coding and decoding speech information has been developed in recent years. In Code Excited Linear Prediction: "High Quality Speech at Low Bit Rate", M. R. Schroeder, Proc. ICASSP '85, pp. 937–940, there is described a speech coder of a CELP type, which is on the basis of such a speech coding technique.

In this speech coder, a linear prediction for an input speech is carried out in every frame, which is divided at a fixed time. A prediction residual (excitation signal) is obtained by the linear prediction for each frame. Then, the prediction residual is coded using an adaptive codebook in which a previous excitation signal is stored and a random codebook in which a plurality of random code vectors is stored.

FIG. 1 shows a functional block of a conventional CELP type speech coder.

A speech signal 11 input to the CELP type speech coder is subjected to a linear prediction analysis in a linear prediction analyzing section 12. A linear predictive coefficients can be obtained by the linear prediction analysis. The linear predictive coefficients are parameters indicating an spectrum envelop of the speech signal 11. The linear predictive coefficients obtained in the linear prediction analyzing section 12 are quantized by a linear predictive coefficient coding section 13, and the quantized linear predictive coefficients are sent to a linear predictive coefficient decoding section 14. Note that an index obtained by this quantization is output to a code outputting section 24 as a linear predictive code. The linear predictive coefficient decoding section 14 decodes the linear predictive coefficients quantized by the linear predictive coefficient coding section 13 so as to obtain coefficients of a synthetic filter. The linear predictive coefficient decoding section 14 outputs these coefficients to a synthetic filter 15.

An adaptive codebook 17 is one, which outputs a plurality of candidates of adaptive codevectors, and which comprises a buffer for storing excitation signals corresponding to previous several frames. The adaptive codevectors are time series vectors, which express periodic components in the input speech.

A random codebook 18 is one, which stores a plurality of candidates of random codevectors. The random code vectors are time series vectors, which express non-periodic components in the input speech.

In an adaptive code gain weighting section 19 and a random code gain weighting section 20, the candidate vectors output from the adaptive codebook 17 and the random codebook 18 are multiplied by an adaptive code gain read from a weight codebook 21 and a random code gain, respectively, and the resultants are output to an adding section 22.

The weighting codebook stores a plurality of adaptive codebook gains by which the adaptive codevector is multiplied and a plurality of random codebook gains by which the random codevectors are multiplied.

The adding section 22 adds the adaptive code vector candidates and the random code vector candidates, which are weighted in the adaptive code gain weighting section 19 and the random code gain weighting section 20, respectively. Then, the adding section 22 generates excitation vectors so as to be output to the synthetic filter 15.

The synthetic filter 15 is an all-pole filter. The coefficients of the synthetic filter are obtained by the linear predictive coefficient decoding section 14. The synthetic filter 15 has a function of synthesizing input excitation vector in order to produce synthetic speech and outputting that synthetic speech to a distortion calculator 16.

A distortion calculator 16 calculates a distortion between the synthetic speech, which is the output of the synthetic filter 15, and the input speech 11, and outputs the obtained distortion value to a code index specifying section 23. The code index specifying section 23 specifies three kinds of codebook indicies (index of adaptive codebook, index of random codebook, index of weight codebook) so as to minimize the distortion calculated by the distortion calculation section 16. The three kinds of codebook indicies specified by the code index specifying section 23 are output to a code outputting section 24. The code outputting section 24 outputs the index of linear predictive codebook obtained by the linear predictive coefficient coding section 13 and the index of adaptive codebook, the index of random code, the index of weight codebook, which have been specified by the code index specifying section 23, to a transmission path at one time.

FIG. 2 shows a functional block of a CELP speech decoder, which decodes the speech signal coded by the aforementioned coder. In this speech decoder apparatus, a code input section 31 receives codes sent from the speech coder (FIG. 1). The received codes are disassembled into the index of the linear predictive codebook, the index of adaptive codebook, the index of random codebook, and the index of weight codebook. Then, the indicies obtained by the above disassemble are output to a linear predictive coefficient decoding section 32, an adaptive codebook 33, a random codebook 34, and a weight codebook 35, respectively.

Next, the linear predictive coefficient decoding section 32 decodes the linear predictive code number obtained by the code input section 31 so as to obtain coefficients of the synthetic filter, and outputs those coefficients to a synthetic filter 39. Then, an adaptive codevector corresponding to the index of adaptive codebook is read from adaptive codebook, and a random codevector corresponding to the index of random codebook is read from the random codebook. Moreover, an adaptive codebook gain and a-random codebook gain corresponding to the index of weight codebook are read from the weight codebook. Then, in an adaptive codevector weighting section 36, the adaptive codevector is multiplied by the adaptive codebook gain, and the resultant is sent to an adding section 38. Similarly, in a random codevector weighting section 37, the random codevector is multiplied by the random codebook gain,: and the resultant is sent to the adding section 38.

The adding section 38 adds the above two codevectors and generates an excitation vector. Then, the generated excitation vector is sent to the adaptive codebook 33 to update the buffer or the synthetic filter 39 to excite the filter. The synthetic filter 39, composed with the linear predictive coeffcients which are output from linear predictive coefficient decoding section 32, is excited by the excitation vector obtained by the adding section 38, and reproduces a synthetic speech.

Note that, in the distortion calculator 16 of the CELP speech coder, distortion E is generally calculated by the following expression (1):

$$E=\|v-(gaHP+gcHC)\|^2 \quad (1)$$

where v: an input speech signal (vector),

H: an impulse response convolution matrix for a synthetic filter $$H=\begin{bmatrix} h(0) & 0 & \cdots & \cdots & 0 & 0 \\ h(1) & h(0) & 0 & \cdots & 0 & 0 \\ h(2) & h(1) & h(0) & 0 & 0 & 0 \\ \vdots & \vdots & \vdots & \ddots & 0 & 0 \\ \vdots & \vdots & \vdots & \ddots & h(0) & 0 \\ h(L-1) & \cdots & \cdots & \cdots & h(1) & h(0) \end{bmatrix}$$

wherein h is an impulse response of a synthetic filter, L is a frame length, p: an adaptive codevector, c: a random codevector, ga: an adaptive codebook gain gc: a random codebook gain Here, in order to minimize distortion E of expression (1), the distortion is calculated by a closed loop with respective to all combinations of the adaptive code number, the random code number, the weight code number, it is necessary to specify each code number.

However, if the closed loop search is performed with respect to expression (1), an amount of calculation processing becomes too large. For this reason, generally, first of all, the index of adaptive codebook is specified by vector quantization using the adaptive codebook. Next, the index of random coodbook is specified by vector quantization using the random codebook. Finally, the index of weight codebook is specified by vector quantization using the weight codebook. Here, the following will specifically explain the vector quantization processing using the random codebook.

In a case where the index of adaptive codebook or the adaptive codebook gain are previously or temporarily determined, the expression for evaluating distortion shown in expression (1) is changed to the following expression (2):

$$Ec=\|x-gcHC\|^2 \quad (2)$$

where vector x in expression (2) is random excitation target vector for specifying a random code number which is obtained by the following equation (3) using the previously or temporarily specified adaptive codevector and adaptive codebook gain.

$$x=v-gaHP \quad (3)$$

where ga: an adaptive codebook gain, v: a speech signal (vector),

H: an impulse response convolution matrix for a synthetic filter, p: an adaptive codevector.

For specifying the random codebook gain gc after specifying the index of random codebook, it can be assumed that gc in the expression (2) can be set to an arbitrary value. For this reason, it is known that a quantization processing for specifying the index of the random codebook minimizing the expression (2) can be replaced with the determination of the index of the random codebook vector maximizing the following fractional expression (4):

$$\frac{(x^t Hc)^2}{\|Hc\|^2} \quad (4)$$

In other words, in a case where the index of adaptive codebook and the adaptive codebook gain are previously or temporarily determined, vector quantization processing for random excitation becomes processing for specifying the index of the random codebook maximizing fractional expression (4) calculated by the distortion calculator 16.

In the CELP coder/decoder in the early stages, one that stores kinds of random sequences corresponding to the number of bits allocated in the memory was used as a random codebook. However, there was a problem in which a massive amount of memory capacity was required and the amount of calculation processing for calculating distortion of expression (4) with respect to each random codevector was greatly increased.

As one of methods for solving the above problem, there is a CELP speech coder/decoder using an algebraic excitation vector generator for generating an excitation vector algebraically as described in "8 KBIT/S ACELP CODING OF SPEECH WITH 10 MS SPEECH-FRAME: A CANDIDATE FOR CCITT STANDARDIZATION": R. Salami, C. Laflamme, J-P. Adoul, ICASSP '94, pp.II-97~II-100, 1994.

However, in the above CELP speech coder/decoder using an algebraic excitation vector generator, random excitation (target vector for specifying an index of random codebook) obtained by equation (3) is approximately expressed by a few signed pulses. For this reason, there is a limitation in improvement of speech quality. This is obvious from an actual investigation of an element for random excitation x of expression (3) wherein there are few cases in which random excitations are composed only of a few signed pulses.

DISCLOSURE OF INVENTION

An object of the present invention is to provide an excitation vector generator, which is capable of generating an excitation vector whose shape has a statistically high similarity to the shape of a random excitation obtained by analyzing an input speech signal.

Also, an object of the present invention is to provide a CELP speech coder/decoder, a speech signal communication system, a speech signal recording system, which use the above excitation vector generator as a random codebook so as to obtain a synthetic speech having a higher quality than that of the case in which an algebraic excitation vector generator is used as a random codebook.

A first aspect of the present invention is to provide an excitation vector generator comprising a pulse vector generating section having N channels ($N\geqq 1$) for generating pulse vectors each having a signed unit pulse provided to one element on a vector axis, a storing and selecting section having a function of storing M ($M\geqq 1$)kinds of dispersion patterns every channel and a function of selecting a certain kind of dispersion pattern from M kinds of dispersion patterns stored, a pulse vector dispersion section having a function of convolving the dispersion pattern selected from the dispersion pattern storing and selecting section to the signed pulse vector output from the pulse vector generator so as to generator N dispersed vectors, and a dispersed vector adding section having a function of adding N dispersed vectors generated by the pulse vector dispersion sect-ion so as to generate an excitation vector. The function for algebraically generating ($N\geqq 1$) pulse vectors is provided to the pulse vector generator, and the dispersion pattern storing and selecting section stores the dispersion patterns obtained by pre-training the shape (characteristic) of the actual vector, whereby making it possible to generate the excitation vector, which is well similar to the shape of the actual excitation vector as compared with the conventional algebraic excitation generator.

Moreover, the second aspect of the present invention is to provide a CELP speech coder/decoder using the above excitation vector generator as the random codebook, which is capable of generating the excitation vector being closer to the actual shape than the case of the conventional speech coder/decoder using the algebraic excitation generator as the random codebook. Therefore, there can be obtained the speech coder/decoder, speech signal communication system, and speech signal recording system, which can output the synthetic speech having a higher quality.

BEST MODE FOR CARRYING OUT THE INVENTION

Embodiments will now be described with reference to the accompanying drawings.

First Embodiment

Figure 3:
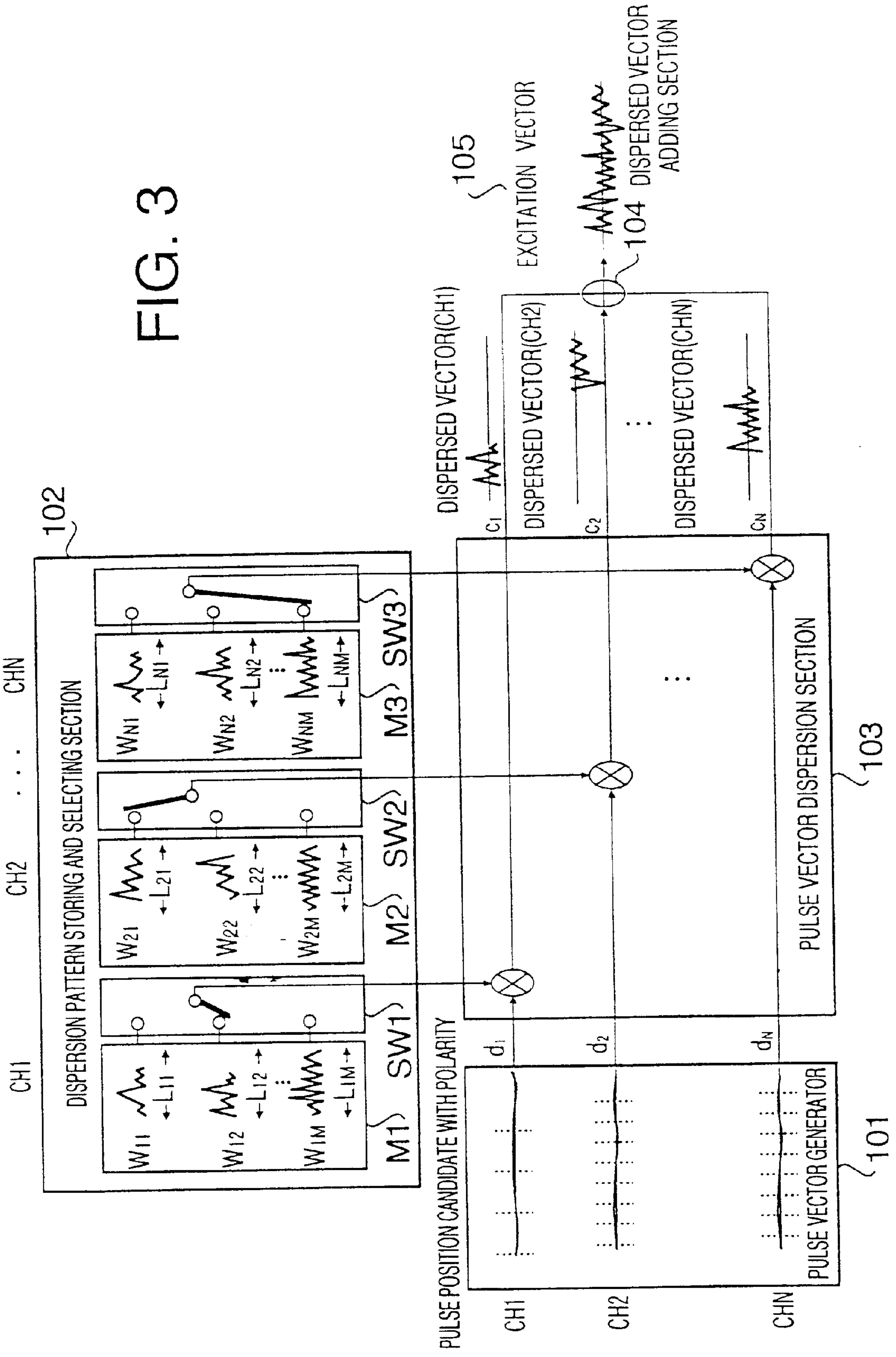
FIG. 3 is a functional block diagram of an excitation vector generator according to a first embodiment of the present invention.

FIG. 3 is a functional block diagram of an excitation vector generator according to a first embodiment of the present invention.

The excitation vector generator comprises a pulse vector generator 101 having a plurality of channels, a dispersion pattern storing and selecting section 102 having dispersion pattern storing sections and switches, a pulse vector dispersion section 103 for dispersing the pulse vectors, and a dispersed vector adding section 104 for adding the dispersed pulse vectors for the plurality of channels.

The pulse vector generator 101 comprises N (a case of N=3 will be explained in this embodiment) channels for generating vectors (hereinafter referred to as pulse vectors) each having a signed unit pulse with provided to one element on a vector axis.

The dispersion pattern storing and selecting section 102 comprises storing sections M1 to M3 for storing M (a case of M=2 will be explained in this embodiment) kinds of dispersion patterns for each channel and switches SW1 to SW2 for selecting one kind of dispersion pattern from M kinds of dispersion patterns stored in the respective storing sections Ml to M3.

The pulse vector dispersion section 103 performs convolution of the pulse vectors output from the pulse vector generator 101 and the dispersion patterns output from the dispersion pattern storing and selecting section 102 in every channel so as to generate N dispersed vectors.

The dispersed vector adding section 104 adds up N dispersed vectors generated by the pulse vector dispersion section 103, thereby generating an excitation vector 105.

Note that, in this embodiment, a case in which the pulse vector generator 101 algebraically generates N (N=3) pulse vectors in accordance with the rule described in Table 1 set forth below will be explained.

TABLE 1

| Channel Number | Polarity | Pulse Position Candidates |
|---|---|---|
| CH1 | ±1 | $P^1(0, 10, 20, 30, \ldots, 60, 70)$ |
| CH2 | ±1 | $P^2\begin{bmatrix} 2, 12, 22, 32, \ldots, 62, 72 \\ 6, 16, 26, 36, \ldots, 66, 76 \end{bmatrix}$ |
| CH3 | ±1 | $P^3\begin{bmatrix} 4, 14, 24, 34, \ldots, 64, 74 \\ 8, 18, 28, 38, \ldots, 68, 78 \end{bmatrix}$ |

An operation of the above-structured excitation vector generator will be explained.

The dispersion pattern storing and selecting section 102 selects a dispersion pattern by one kind by one from dispersion patterns stored two kinds by two for each channel, and outputs the dispersion pattern. In this case, the number is allocated to each dispersion pattern in accordance with the combinations of selected dispersion patterns (total number of combinations: $M^N=8$).

Next, the pulse vector generator 101 algebraically generates the signed pulse vectors corresponding to the number of channels (three in this embodiment) in accordance with the rule described in Table 1.

The pulse vector dispersion section 103 generates a dispersed vector for each channel by convolving the dispersion patterns selected by the dispersion pattern storing and selecting section 102 with the signed pulses generated by the pulse vector generator 101 based on the following expression (5):

$$ci(n) = \sum_{k=0}^{L-1} wij(n-k)di(k) \quad (5)$$

where n: 0~L−1,

L: dispersion vector length, i: channel number, j: dispersion pattern number (j=1~M), ci: dispersed vector for channel i, wij: dispersed pattern for channel i, j wherein the vector length of wij(m) is 2L−1 (m: −(L−1)~L−1), and it is the element, Lij, that can specify the value and the other elements are zero, di: signed pulse vector for channel i, di=±δ(n−pi), n=0~L−1, and pi: pulse position candidate for channel i.

The dispersed vector adding section 104 adds up three dispersed vectors generated by the pulse vector dispersion section 103 by the following equation (6) so as to generate the excitation vector 105.

$$c(n) = \sum_{i=1}^{N} ci(n) \quad (6)$$

where c: excitation vector, ci: dispersed vector, i: channel number (i=1~N), and n: vector element number (n=0~L−1: note that L is an excitation vector length).

The above-structured excitation vector generator can generate various excitation vectors by adding variations to the combinations of the dispersion patterns, which the dispersion pattern storing and selecting section 102 selects, and the pulse position and polarity in the pulse vector, which the pulse vector generator 101 generates.

Then, in the above-structured excitation vector generator, it is possible to allocate bits to two kinds of information having the combinations of dispersion patterns selected by the dispersion pattern storing and selecting section 102 and the combinations of the shapes (the pulse positions and polarities) generated by the pulse vector generator 101. The indices of this excitation vector generator are in a one-to-one correspondence with two kinds of information. Also, a training processing is executed based on actual excitation information in advance and the dispersion patterns obtainable as the training result can be stored in the dispersion pattern storing and selecting section 102.

Moreover, the above excitation vector generator is used as the excitation information generator of speech coder/decoder to transmit two kinds of indices including the combination index of dispersion patterns selected by the dispersion pattern storing and selecting section 102 and the combination index of the configuration (the pulse positions and polarities) generated by the pulse vector generator 101, thereby making it possible to transmit information on random excitation.

Also, the use of the above-structured excitation vector generator allows the configuration (characteristic) similar to actual excitation information to be generated as compared with the use of algebraic codebook.

The above embodiment explained the case in which the dispersion pattern storing and selecting section 102 stored two kinds of dispersion patterns per one channel. However, the similar function and effect can be obtained in a case in which the dispersion patterns other than two kinds are allocated to each channel.

Also, the above embodiment explained the case in which the pulse vector generator 101 was based on the three-channel structure and the pulse generation rule described in Table 1. However, the similar function and effect can be obtained in a case in which the number of channels is different and a case in which the pulse generation rule other than Table 1 is used as a pulse generation rule.

A speech signal communication system or a speech signal recording system having the above excitation vector generator or the speech coder/decoder is structured, thereby obtaining the functions and effects which the above excitation vector generator has.

Second Embodiment

Figure 4:
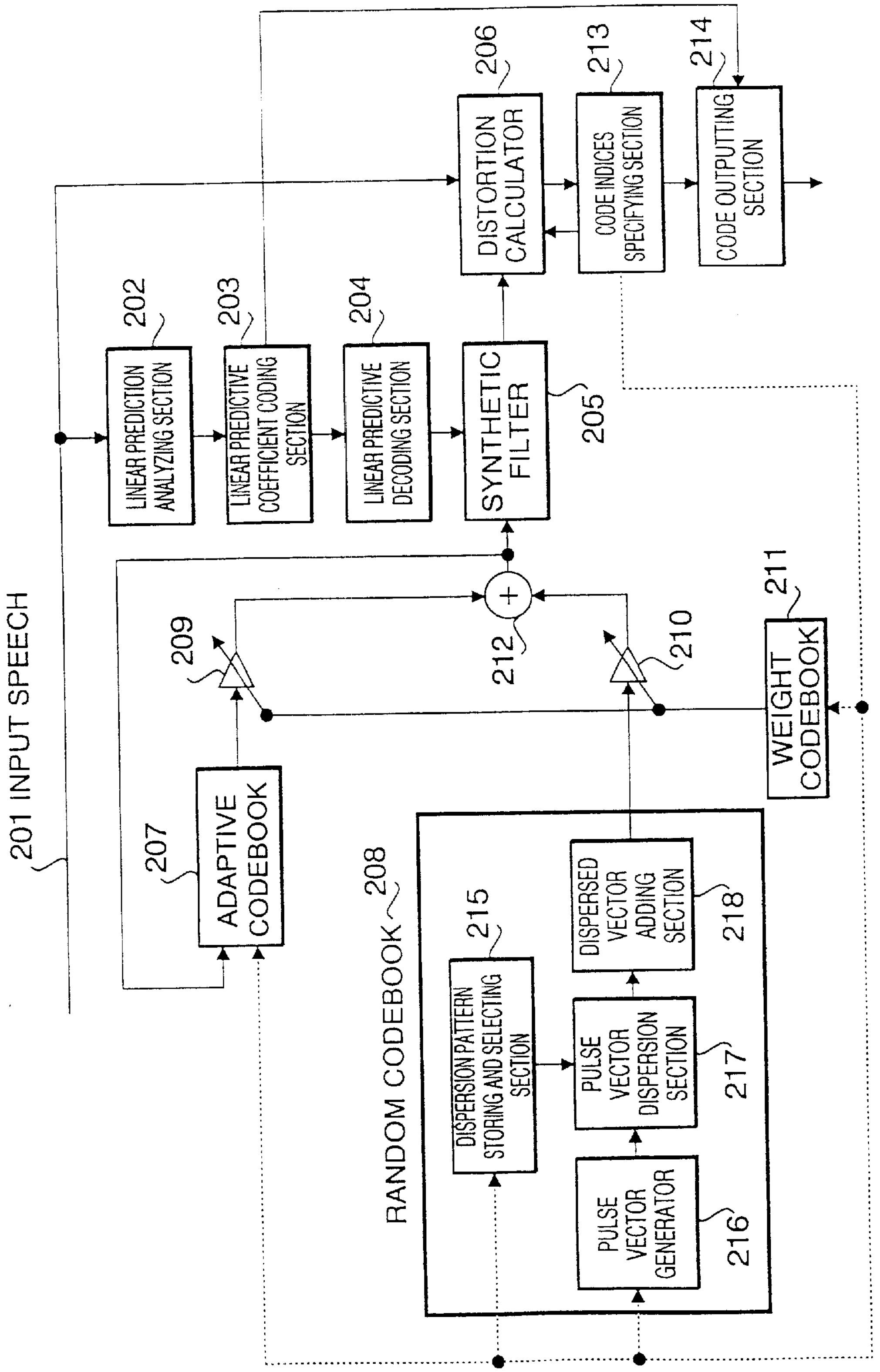
FIG. 4 is a functional block diagram of a CELP speech coder according to a second embodiment of the present invention.
Figure 5:
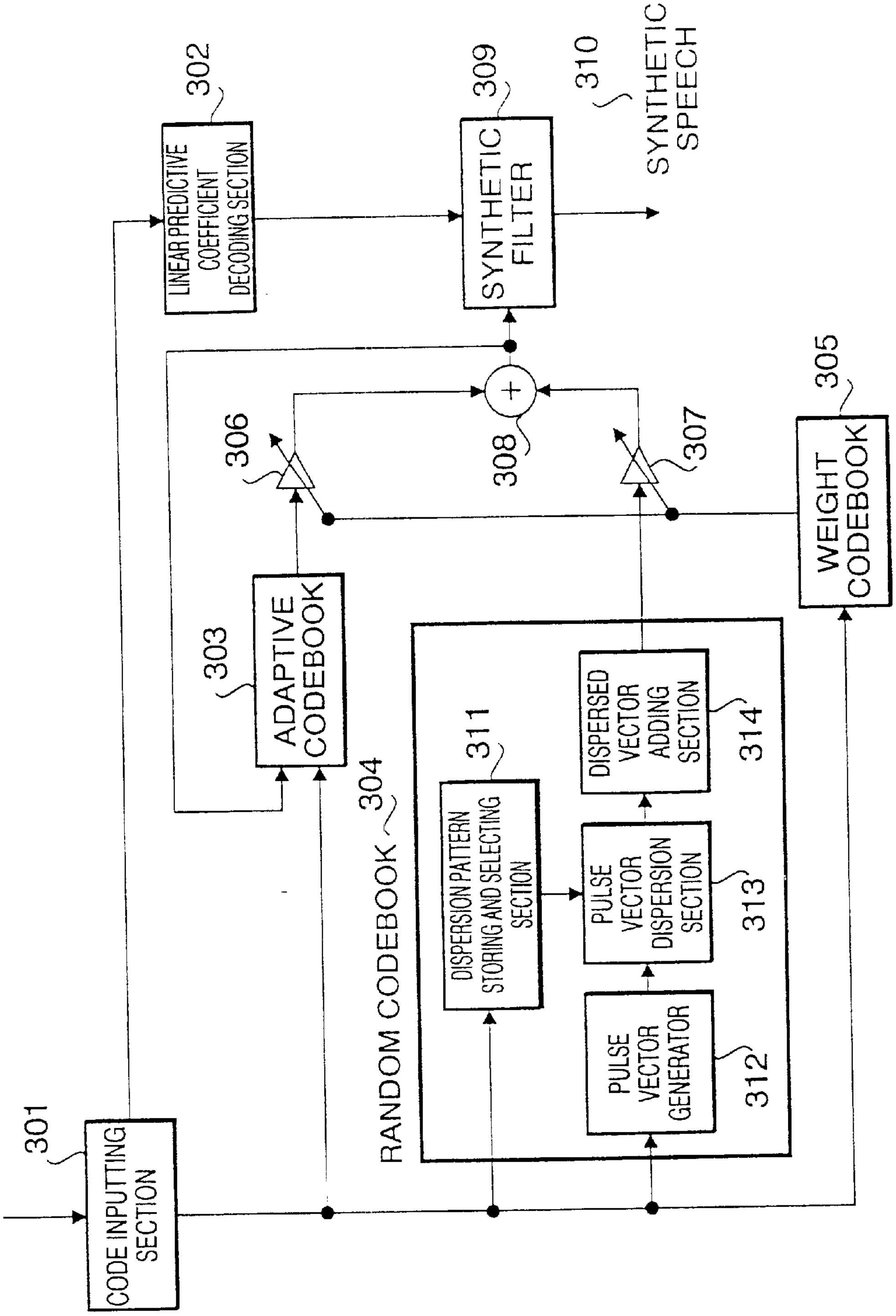
FIG. 5 is a functional block diagram of a CELP speech decoder according to the second embodiment of the present invention.

FIG. 4 shows a functional block of a CELP speech coder according to the second embodiment, and FIG. 5 shows a functional block of a CELP speech decoder.

Figure 1:
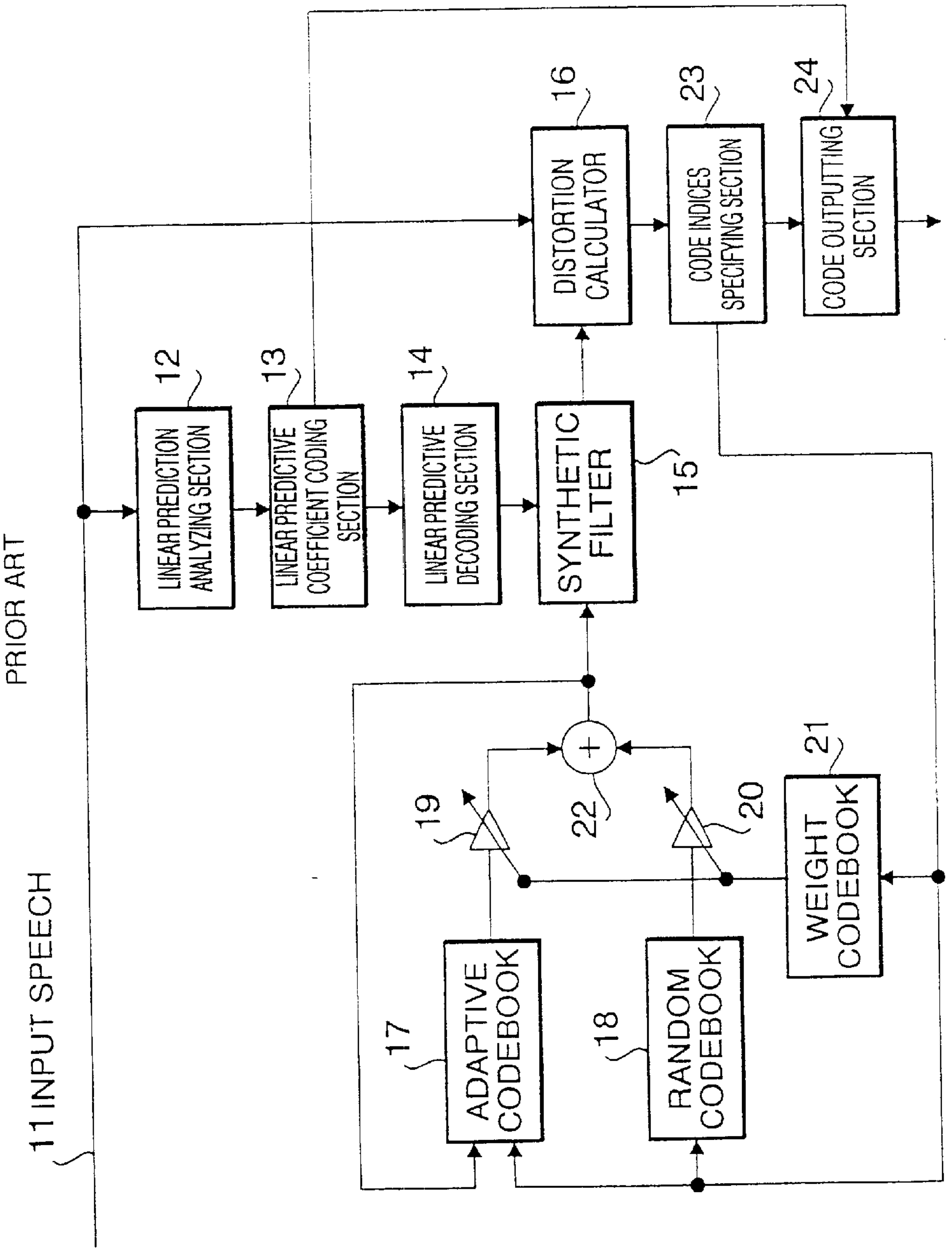
FIG. 1 PRIOR ART
FIG. 1 is a functional block diagram of a conventional CELP speech coder.
Figure 2:
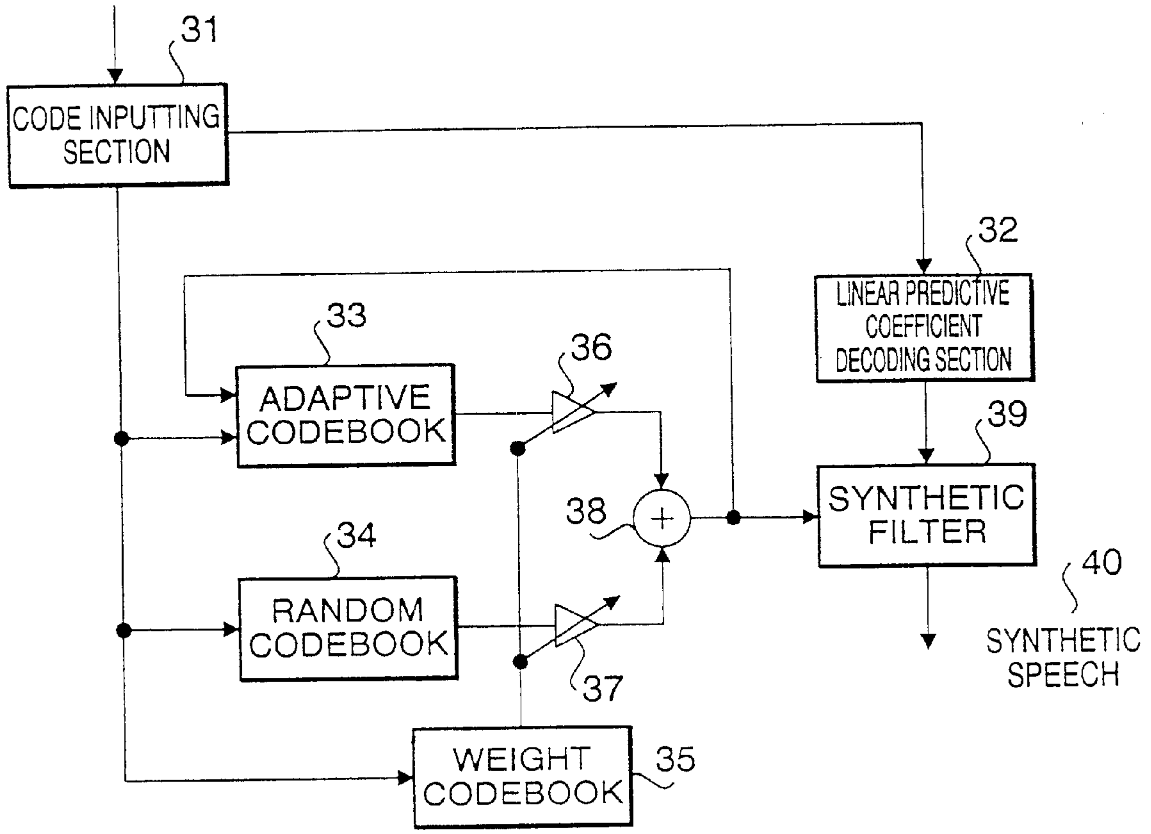
FIG. 2 PRIOR ART
FIG. 2 is a functional block diagram of a conventional CELP speech decoder.

The CELP speech coder according to this embodiment applies the excitation vector generator explained in the first embodiment to the random codebook of the CELP speech coder of FIG. 1. Also, the CELP speech decoder according to this embodiment applies the excitation vector generator explained in the first embodiment to the random codebook of the CELP speech decoder of FIG. 2. Therefore, processing other than vector quantization processing for random excitation is the same as that of the apparatuses of FIGS. 1 and 2. This embodiment will explain the speech coder and the speech decoder with particular emphasis on vector quantization processing for random excitation. Also, similar to the first embodiment, the generation of pulse vectors are based on Table 1 wherein the number of channels N=3 and the number of dispersion patterns for one channel M=2.

The vector quantization processing for random excitation in the speech coder illustrated in FIG. 4 is one that specifies two kinds of indices (combination index for dispersion patterns and combination index for pulse positions and pulse polarities) so as to maximize reference values in expression (4).

In a case where the excitation vector generator illustrated in FIG. 3 is used as a random codebook, combination index for dispersion patterns (eight kinds) and combination index for pulse vectors (case considering the polarity: 16384 kinds) are searched by a closed loop.

For this reason, a dispersion pattern storing and selecting section 215 selects either of two kinds of dispersion patterns stored in the dispersion pattern storing and selecting section itself, and outputs the selected dispersion pattern to a pulse vector dispersion section 217. Thereafter, a pulse vector generator 216 algebraically generates pulse vectors corresponding to the number of channels (three in this embodiment) in accordance with the rule described in Table 1, and outputs the generated pulse vectors to the pulse vector dispersion section 217.

The pulse vector dispersion section 217 generates a dispersed vector for each channel by a convolution calculation. The convolution calculation is performed on the basis of the expression (5) using the dispersion patterns selected by the dispersion pattern storing and selecting section 215 and the signed pulses generated by the pulse vector generator 216.

A dispersion vector adding section 218 adds up the dispersed vectors obtained by the pulse vector dispersion section 217, thereby generating excitation vectors (candidates for random codevectors).

Then, a distortion calculator 206 calculates evaluation values according to the expression (4) using the random code vector candidate obtained by the dispersed vector adding section 218. The calculation on the basis of the expression (4) is carried out with respect to all combinations of the pulse vectors generated based on the rule of Table 1. Then, among the calculated values, the combination index for dispersion patterns and the combination index for pulse vectors (combination of the pulse positions and the polarities), which are obtained when the evaluation value by the expression (4) becomes maximum and the maximum value are output to a code number specifying section 213.

Next, the dispersion pattern storing and selecting section 215 selects the combination for dispersion patterns which is different from the previously selected combination for the dispersion patterns. Regarding the combination for dispersion patterns newly selected, the calculation of the value of expression (4) is carried out with respect to all combinations of the pulse vectors generated by the pulse vector generator 216 based on the rule of Table 1. Then, among the calculated values, the combination index for dispersion patterns and the combination index for pulse vectors, which are obtained when the value of expression (4) becomes maximum and the maximum value are output to the code indices specifying section 213 again.

The above processing is repeated with respect to all combinations (total number of combinations is eight in this embodiment) selectable from the dispersion patterns stored in the dispersion pattern storing and selecting section 215.

The code indices specifying section 213 compares eight maximum values in total calculated by the distortion calculator 206, and selects the highest value of all. Then, the code indices specifying section 213 specifies two kinds of combination indices (combination index for dispersion patterns, combination index for pulse vectors), which are obtained when the highest value is generated, and outputs the specified combination indices to a code outputting section 214 as an index of random codebook.

On the other hand, in the speech decoder of FIG. 5, a code inputting section 301 receives codes transmitted from the speech coder (FIG. 4), decomposes the received codes into the corresponding index of LPC codebook, the index of adaptive codebook, the index of random codebook (composed of two kinds of the combination index for dispersion patterns and combination index for pulse vectors) and the index of weight codebook. Then, the code inputting section 301 outputs the decomposed indicies to a linear prediction coefficient decoder 302, an adaptive codebook, a random codebook 304, and a weight codebook 305. Note that, in the random code number, that the combination index for dispersion patterns is output to a dispersion pattern storing and storing section 311 and the combination index for pulse vectors is output to a pulse vector generator 312.

Then, the linear prediction coefficient decoder 302 decodes the linear predictive code number, obtains the coefficients for a synthetic filter 309, and outputs the obtained coefficients to the synthetic filter 309. In the adaptive codebook 303, an adaptive codevector corresponding to the index of adaptive codebook is read from.

In the random codebook 304, the dispersion pattern storing and selecting section 311 reads the dispersion patterns corresponding to the combination index for dispersion pulses in every channel, and outputs the resultant to a pulse vector dispersion section 313. The pulse vector generator 312 generates the pulse vectors corresponding to the combination index for pulse vectors and corresponding to the number of channels, and outputs the resultant to the pulse vector dispersion section 313. The pulse vector dispersion section 313 generates a dispersed vector for each channel by convolving the dispersion patterns received from the dispersion pattern storing and selecting section 311 on the singed pulses received from the pulse vector generator 312. Then, the generated dispersed vectors are output to a dispersion vector adding section 314. The dispersion vector adding section 314 adds up the dispersed vectors of the respective channels generated by the pulse vector dispersion section 313, thereby generating a random codevector.

Then, an adaptive codebook gain and a random codebook gain corresponding to the index of weight codebook are read from the weight codebook 305. Then, in an adaptive code vector weighting section 306, the adaptive codevector is multiplied by the adaptive codebook gain. Similarly in a random code vector weighting section 307, the random codevector is multiplied by the random codebook gain. Then, these resultants are output to an adding section 308.

The adding section 308 adds up the above two code vectors multiplied by the gains so as to generate an excitation vector. Then, the adding section 308 outputs the generated excitation vector to the adaptive codebook 303 to update a buffer or to the synthetic filter 309 to excite the synthetic filter.

The synthetic filter 309 is excited by the excitation vector obtained by the adding section 308, and reproduces a synthetic speech 310. Also, the adaptive codebook 303 updates the buffer by the excitation vector received from the adding section 308.

In this case, suppose that the dispersion patterns obtained by pre-training are stored for each channel in the dispersion pattern storing and selecting section of FIGS. 4 and 5 such that a value of cost function becomes smaller wherein the cost function is a distortion evaluation expression (7) in which the excitation vector described in expression (6) is substituted into c of expression (2).

$$\begin{aligned} Ec &= \left\| x - gcH\sum_{i=1}^{N} ci \right\|^2 \\ &= \sum_{n=0}^{L-1}\left( x(n) - gcH\sum_{i=1}^{N} ci(n) \right)^2 \\ &= \sum_{n=0}^{L-1}\left( x(n) - gcH\sum_{i=1}^{N}\sum_{k=0}^{L-1} wij(n-k)di(k) \right)^2 \end{aligned} \tag{7}$$

where x: target vector for specifying index of random codebook, gc: random codebook gain, H: impulse response convolution matrix for synthetic filter, c: random codevector, i: channel number (ii=1~N), j: dispersion pattern number (j=1~M)

ci: dispersion vector for channel i, wij: dispersion patterns for channels i-th, j-th kinds, di: pulse vector for channel i, and L: excitation vector length (n=0~L−1).

The above embodiment explained the case in which the dispersion patterns obtained by pre-training were stored M by M for each channel in the dispersion pattern storing and selecting section such that the value of cost function expression (7) becomes smaller. However, in actual, all M dispersion patterns do not have to be obtained by training. If at least one kind of dispersion pattern obtained by training is stored, it is possible to obtain the functions and effects to improve the quality of the synthesized speech.

Also, the above embodiment explained that case in which from all combinations of dispersion patterns stored in the dispersion pattern storing and selecting section stores and all combinations of pulse vector position candidates generated by the pulse vector generator, the combination index that maximized the reference value of expression (4) was specified by the closed loop. However, the similar functions and effects can be obtained by carrying out a pre-selection based on other parameters (ideal gain for adaptive codevector, etc.) obtained before specifying the index of the random codebook or by a open loop search.

Moreover, a speech signal communication system or a speech signal recording system having the above the speech coder/decoder is structured, thereby obtaining the functions and effects which the excitation vector generator described in the first embodiment has.

Third Embodiment

Figure 6:
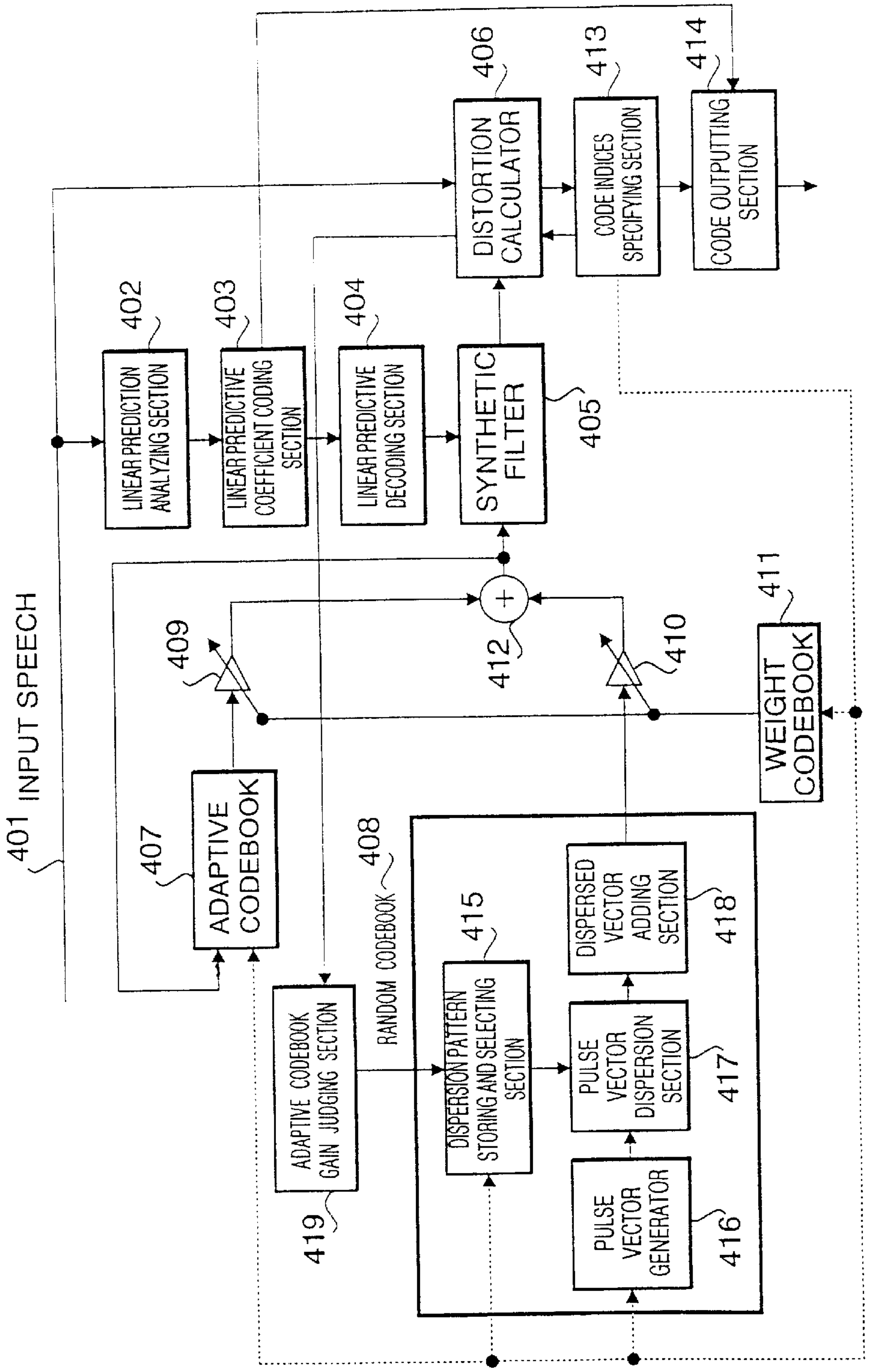
FIG. 6 is a functional block diagram of a CELP speech coder according to a third embodiment of the present invention.

FIG. 6 is a functional block of a CELP speech coder according to the third embodiment. According to this embodiment, in the CELP speech coder using the excitation vector generator of the first embodiment in the random codebook, a pre-selection for dispersion patterns stored in the dispersion pattern storing and selecting section is carried out using the value of an ideal adaptive codebook gain obtained before searching the index of random codebook. The other portions of the random codebook peripherals are the same as those of the CELP speech coder of FIG. 4. Therefore, this embodiment will explain the vector quantization processing for random excitation in the CELP speech coder of FIG. 6.

This CELP speech coder comprises an adaptive codebook 407, an adaptive codebook gain weighting section 409, a random codebook 408 constituted by the excitation vector generator explained in the first embodiment, a random codebook gain weighting section 410, a synthetic filter 405, a distortion calculator 406, an indices specifying section 413, a dispersion pattern storing and selecting section 415, a pulse vector generator 416, a pulse vector dispersion section 417, a dispersed vector adding section 418, and a distortion power juding section 419.

In this case, according to the above embodiment, suppose that at least one of M (M=2) kinds of dispersion patterns stored in the dispersion pattern storing and selecting section 415 is the dispersion pattern that is obtained from the result by performing a pre-training to reduce quantization distortion generated in vector quantization processing for random excitation In this embodiment, for simplifying the explanation, it is assumed that the number N of channels of the pulse vector generator is 3, and the number M of kinds of dispersion patterns for each channel stored in the dispersion pattern storing and selecting section is 2. Also, suppose that one of M (M=2) kinds of dispersion patterns is dispersion pattern obtained by the above-mentioned training, and other is random vector sequence (hereinafter referred to as random pattern) which is generated by a random vector generator. Additionally, it is known that the dispersion pattern obtained by the above training has a relatively short length and a pulse-like shape as in w11 of FIG. 3.

In the CELP speech coder of FIG. 6, processing for specifying the index of the adaptive codebook before vector quantization of random excitation is carried out. Therefore, at the time when vector quantization processing of random excitation is carried out, it is possible to refer to the index of the adaptive codebook and the ideal adaptive codebook gain (temporarily decided). In this embodiment, the pre-selection for dispersion patterns is carried out using the value of the ideal adaptive codebook gain.

More specifically, first, the ideal value of the adaptive codebook gain stored in the code indices specifying section 413 just after the search for the index of adaptive codebook is output to the distortion calculator 406. The distortion calculator 406 outputs the adaptive codebook gain received from the code indices specifying section 413 to the adaptive codebook gain judging section 419.

The adaptive gain judging section 419 performs a comparison between the value of the ideal adaptive codebook gain received from the distortion calculator 409 and a preset threshold value. Next, the adaptive codebook gain judging section 419 sends a control signal for a pre-selection to the dispersion pattern storing and selecting section 415 based on the result of the comparison. The contents of the control signal will be explained as follows.

More specifically, when the adaptive codebook gain is larger than the threshold value as a result of the comparison, the control signal provides an instruction to select the dispersion pattern obtained by the pre-training to reduce the quantization distortion in vector quantization processing for random excitations. Also, when the adaptive code gain is not larger than the threshold value as a result of the comparison, the control signal provides an instruction to carry out the pre-selection for the dispersion pattern different from the dispersion pattern obtained from the result of the pre-training.

As a consequence, in the dispersion pattern storing and selecting selection 415, the dispersion pattern of M (M=2) kinds, which the respective channels store, can be pre-selected in accordance with the value of the ideal adaptive codebook gain, so that the number of combinations of dispersion patterns can be largely reduced. This eliminates the need of the distortion calculation for all the combinations of the dispersion patterns, and makes it possible to efficiently perform the vector quantization processing for random excitation with a small amount of calculations.

Moreover, the random codevector is pulse-like shaped when the value of the adaptive gain is large (this segment is determined as voiced) and is randomly shaped when the value of the adaptive gain is small (this segment is determined as unvoiced). Therefore, since the random code vector having a suitable shape for each of the voice segment the speech signal and the non-voice segment can be used, the quality of the synthtic speech can be improved.

Due to the simplification of the explanation, this embodiment explained limitedly the case in which the number N of channels of the pulse vector generator was 3 and the number M of kinds of the dispersion patterns was 2 per channel stored in the dispersion pattern storing and selecting section. However, similar effects and functions can be obtained in a case in which the number of channels of the pulse vector generator and the number of kinds of the dispersion patterns per channel stored in the dispersion pattern storing and selecting section are different from the aforementioned case.

Also, due to the simplification of the explanation, the above embodiment explained the case in which one of M kinds (M=2) of dispersion patterns stored in each channel was dispersion patterns obtained by the above training and the other was random patterns. However, if at least one kind of dispersion pattern obtained by the training is stored for each channel, the similar effects and functions can be expected instead of the above-explained case.

Moreover, this embodiment explained the case in which large and small information of the adaptive codebook gain was used in means for performing pre-selection of the dispersion patterns. However, if other parameters showing a short-time character of the input speech are used in addition to large and small information of the adaptive codebook gain, the similar effects and functions can be further expected.

Further, a speech signal communication system or a speech signal recording system having the above the speech coder/decoder is structured, thereby obtaining the functions and effects which the excitation vector generator described in the first embodiment has.

In the explanation of the above embodiment, there was explained the method in which the pre-selection of the dispersion pattern was carried out using the ideal adaptive codebook gain of the current frame at the time when vector quantization processing of random excitation was performed. However, the similar structure can be employed even in a case in which a decoded adaptive codebook gain obtained in the previous frame is used instead of the ideal adaptive codebook gain in the current frame. In this case, the similar effects can be also obtained.

Fourth Embodiment

Figure 7:
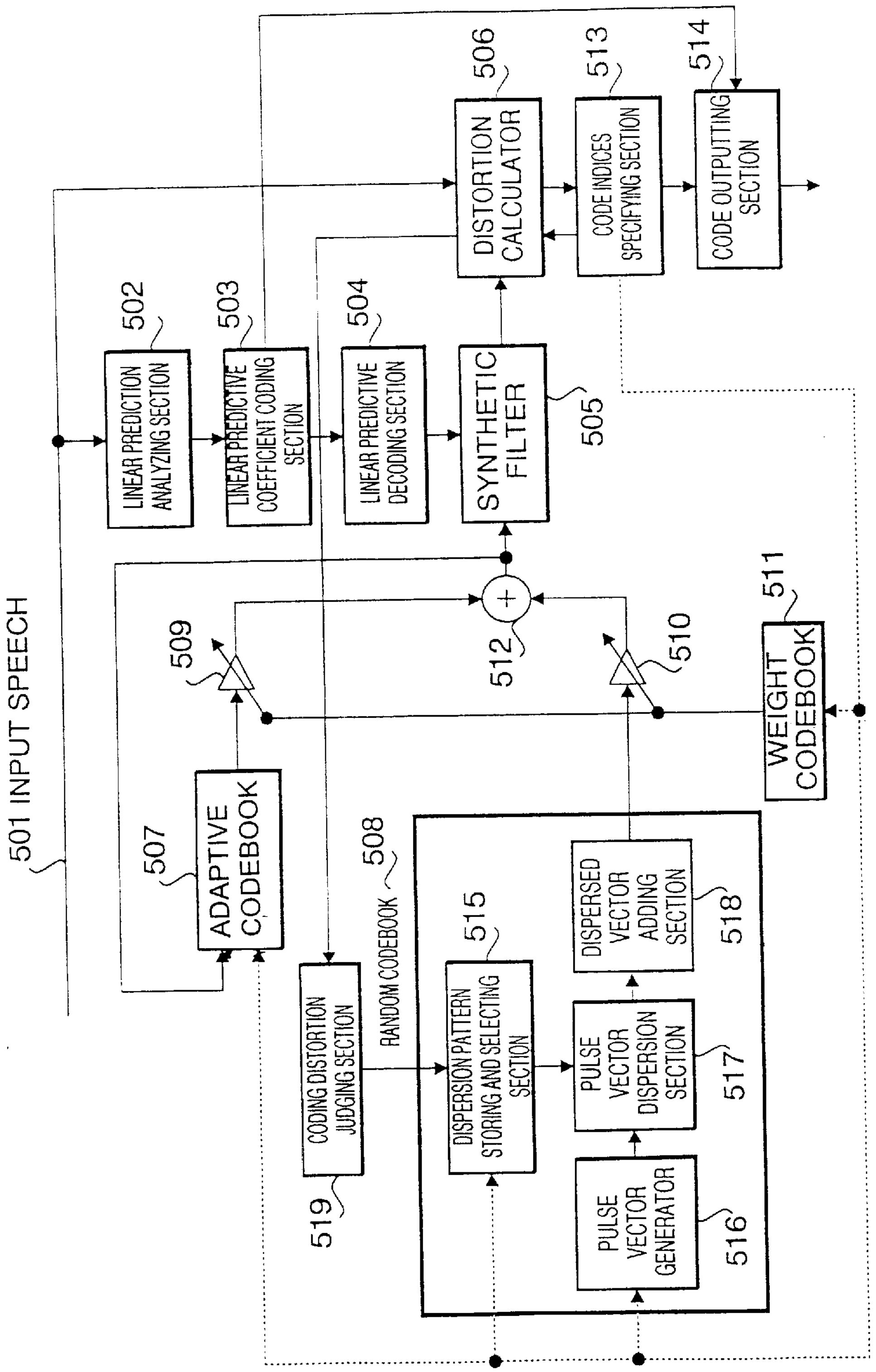
FIG. 7 is a functional block diagram of a CELP speech coder according to a fourth embodiment of the present invention.

FIG. 7 is a functional block diagram of a CELP speech coder according to the fourth embodiment. In this embodiment, in the CELP speech coder using the excitation vector generator of the first embodiment in the random codebook, a pre-selection for a plurality of dispersion patterns stored in the dispersion pattern storing and selecting section is carried out using available information at the time of vector quantization processing for random excitations. It is characterized that a value of a coding distortion (expressed by an S/N ratio), that is generated in specifying the index of the adaptive codebook, is used as a reference of the pre-selection.

Note that the other portions of the random codebook peripherals are the same as those of the CELP speech coder of FIG. 4. Therefore, this embodiment will specifically explain the vector quantization processing for random excitation.

As shown in FIG. 7, this CELP speech coder comprises an adaptive codebook 507, an adaptive codebook gain weighting section 509, a random codebook 508 constituted by the excitation vector generator explained in the first embodiment, a random codebook gain weighting section 510, a synthetic filter 505, a distortion calculator 506, a code indices specifying section 513, a dispersion pattern storing and selecting section 515, a pulse vector generator 516, a pulse vector dispersion section 517, a dispersed vector adding section 518, and a coding distortion judging section 519.

In this case, according to the above embodiment, suppose that at least one of M (M=≧2) kinds of dispersion patterns stored in the dispersion pattern storing and selecting section 515 is the random pattern.

In the above embodiment, for simplifying the explanation, the number N of channels of the pulse vector generator is 3 and the number M of kinds of the dispersion patterns is 2 per channel stored in the dispersion pattern storing and selecting section. Moreover, one of M (M=2) kinds of dispersion patterns is the random pattern, and the other is the dispersion pattern that is obtained as the result of pre-training to reduce quantization distortion generated in vector quantization processing for random excitations.

In the CELP speech coder of FIG. 7, processing for specifying the index of the adaptive codebook is performed before vector quantization processing for random excitation. Therefore, at the time when vector a quantization processing of random excitation is carried out, it is possible to refer to the index of the adaptive codebook, the ideal adaptive codebook gain (temporarily decided), and the target vector for searching the adaptive codebook. In this embodiment, the pre-selection for dispersion patterns is carried out using the coding distortion (expressed by S/N ratio) of the adaptive codebook which can be calculated from the above three information.

More specifically, the index of adaptive codebook and the value of the adaptive codebook gain (ideal gain) stored in the code indices specifying section 513 just after the search for the adaptive codebook is output to the distortion calculator 506. The distortion calculator 506 calculates the coding distortion (S/N ratio) generated by specifying the index of the adaptive codebook using the index of adaptive codebook received from the code indices specifying section 513, the adaptive codebook gain, and the target vector for searching the adaptive codebook. Then, the distortion calculator 506 outputs the calculated S/N value to the coding distortion juding section 519.

The coding distortion juding section 519 performs a comparison between the S/N value received from the distortion calculator 506 and a preset threshold value. Next, the coding distortion juding section 519 sends a control signal for a pre-selection to the dispersion pattern storing and selecting section 515 based on the result of the comparison. The contents of the control signal will be explained as follows.

More specifically, when the S/N value is larger than the threshold value as a result of the comparison, the control signal provides an instruction to select the dispersion pattern obtained by the pre-training to reduce the quantization distortion generated by coding the target vector for searching the random codebook. Also, when the S/N value is smaller than the threshold value as a result of the comparison, the control signal provides an instruction to select the non-pulse-like random patterns.

As a consequence, in the dispersion pattern storing and selecting selection 515, only one kind is pre-selected from M (M=2) kinds of dispersion patterns, which the respective channels store, so that the number of combinations of dispersion patterns can be largely reduced. This eliminates the need of the distortion calculation for all the combinations of the dispersion patterns, and makes it possible to efficiently specify the index of the random codebook with a small amount of calculations.

Moreover, the random codevector is pulse-like shaped when the S/N value is large, and is non-pulse-like shaped when the S/N value is small. Therefore, since the shape of the random codevector can be changed in accordance with the short-time characteristic of the speech signal, the quality of the synthetic speech can be improved.

Due to the simplification of the explanation, this embodiment explained limitedly the case in which the number N of channels of the pulse vector generator was 3 and the number M of kinds of the dispersion patterns was 2 per channel stored in the dispersion pattern storing and selecting section.

However, similar effects and functions can be obtained in a case in which the number of channels of the pulse vector generator and the number of kinds of the dispersion patterns per channel stored in the dispersion pattern storing and selecting section are different from the aforementioned case.

Also, due to the simplification of the explanation, the above embodiment explained the case in which one of M kinds (M=2) of dispersion patterns stored in each channel was dispersion patterns obtained by the above pre-training and the other was random patterns. However, if at least one kind of random dispersion pattern is stored for each channel, the similar effects and functions can be expected instead of the above-explained case.

Moreover, this embodiment explained the case in which only large and small information of coding distortion (expressed by S/N value) generated by specifying the index of the adaptive codebook was used in means for pre-selecting the dispersion pattern. However, if other information, which correctly shows the short-time characteristic of the speech signal, is employed in addition thereto, the similar effects and functions can be further expected.

Further, a speech signal communication system or a speech signal recording system having the above the speech coder/decoder is structured, thereby obtaining the functions and effects which the excitation vector generator described in the first embodiment has.

Fifth Embodiment

Figure 8:
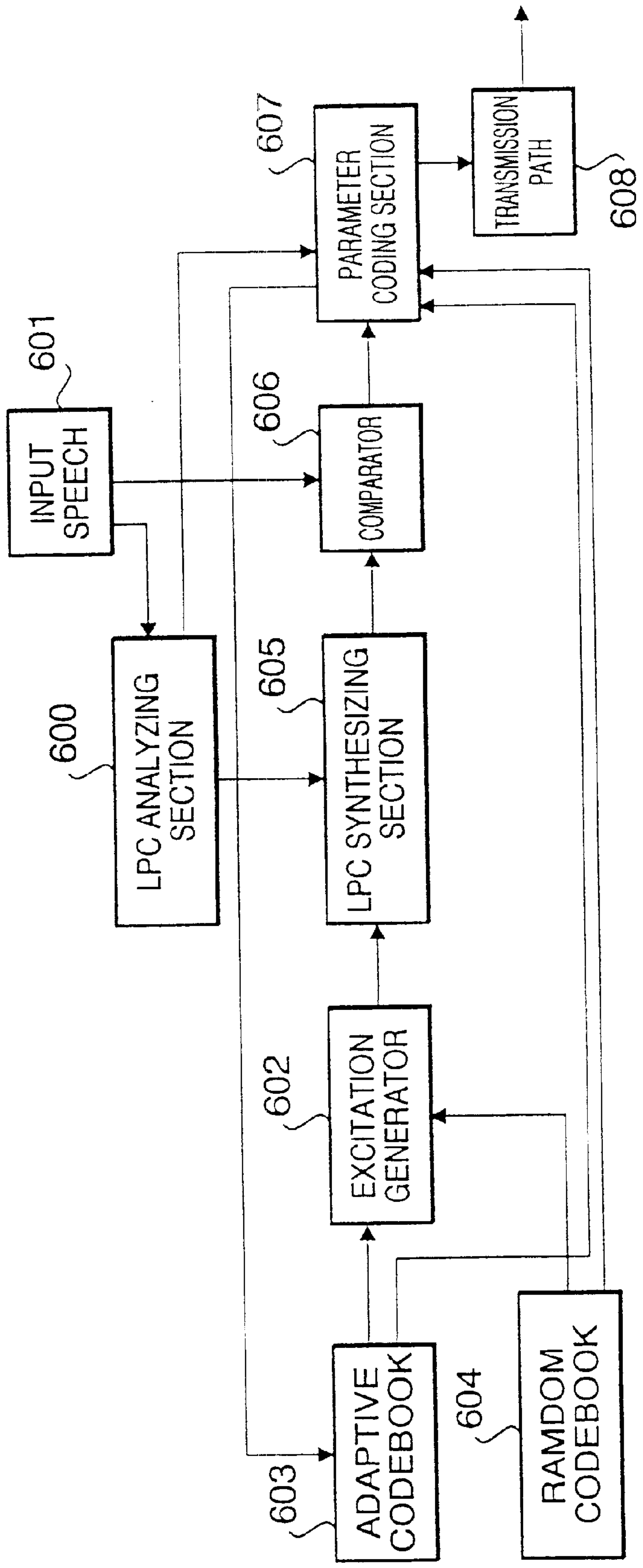
FIG. 8 is a functional block diagram of a CELP speech coder according to a fifth embodiment of the present invention.

FIG. 8 shows a functional block of a CELP speech coder according to the fifth embodiment of the present invention. According to this CELP speech coder, in an LPC analyzing section 600 performs a self-correlation analysis and an LPC analysis of input speech data 601, thereby obtaining LPC coefficients. Also, the obtained LPC coefficients are quantized so as to obtain the index of LDC codebook, and the obtained index is decoded so as to obtain decoded LPC coefficients.

Next, an excitation generator 602 takes out excitation samples stored in an adaptive codebook 603 and a random codebook 604 (an adaptive codevector (or adaptive excitation) and random codevector (or a random excitation)) and sends them to an LPC synthesizing section 605.

The LPC synthesizing section 605 filters two excitations obtained by the excitation generator 602 by the decoded LPC coefficient obtained by the LPC analyzing section 600, thereby obtaining two synthesized excitations.

In a comparator 606, the relationship between two synthesized excitations obtained by the LPC synthesizing section 605 and the input speech 601 is analyzed so as to obtain an optimum value (optimum gain) of two synthesized excitations. Then, the respective synthesized excitations, which are power controlled by the optimum value, are added so as to obtain an integrated synthesized speech, and a distance calculation between the integrated synthesized speech and the input speech is carried out.

The distance calculation between each of many integrated synthesized speeches, which are obtained by exciting the excitation generator 602 and the LPC synthesizing section 605, and the input speech 601 is carried out with respect to all excitation samples of the adaptive codebook 603 and the random codebook 604. Then, an index of the excitation sample, which is obtained when the value is the smallest in the distances obtainable from the result, is determined.

Also, the obtained optimum gain, the index of the excitation sample, and two excitations responding to the index are sent to a parameter coding section 607. In the parameter coding section 607, the optimum gain is coded so as to obtain a gain code, and the index of LPC codebook and the index of the excitation sample are sent to a transmission path 608 at one time.

Moreover, an actual excitation signal is generated from two excitations responding to the gain code and the index, and the generated excitation signal is stored in the adaptive codebook 603 and the old excitation sample is abandoned at the same time.

Note that, in the LPC synthesizing section 605, a perceptual weighting filter using the linear predictive coefficients, a high-frequency enhancement filter, a long-term predictive filter, (obtained by carrying out a long-term prediction analysis of input speech) are generally employed. Also, the excitation search for the adaptive codebook and the random codebook is generally carried out in segments (referred to as subframes) into which an analysis segment is further divided.

The following will explain the vector quantization for LPC coefficients in the LPC analyzing section 600 according to this embodiment.

Figure 9:
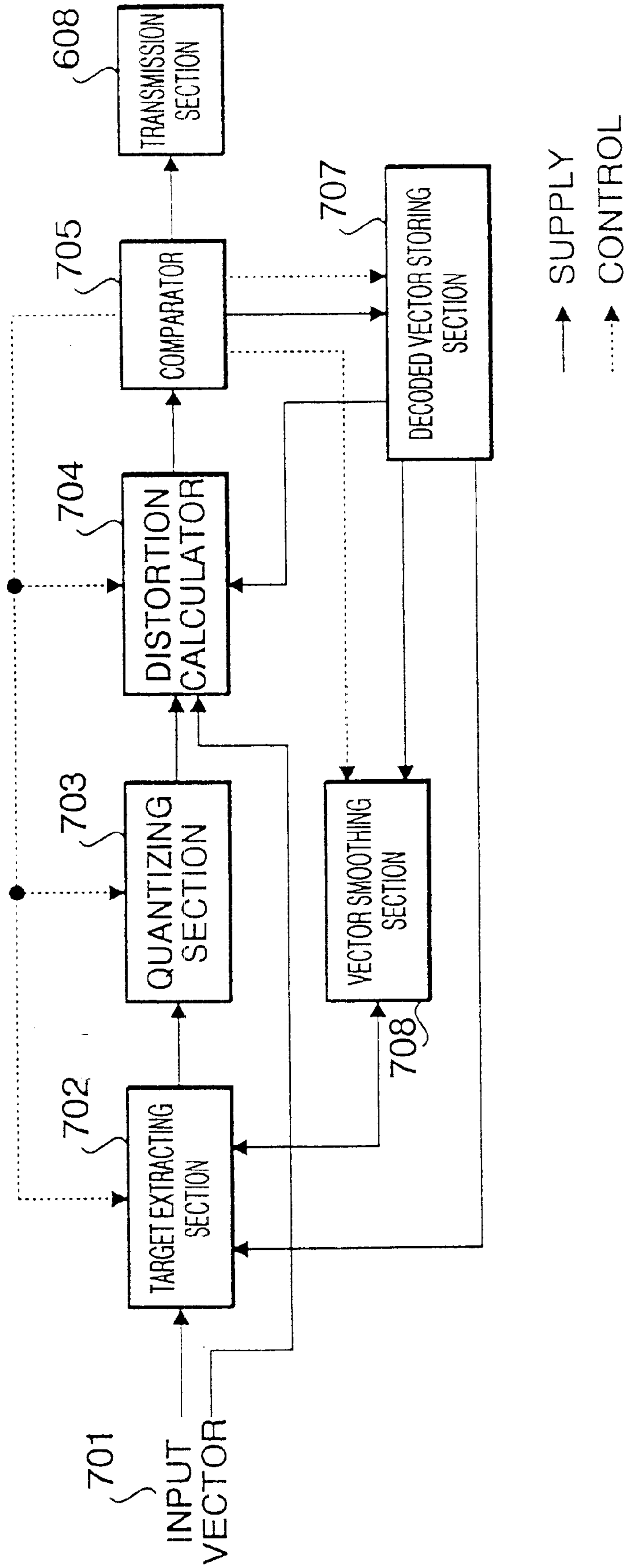
FIG. 9 is a functional block diagram of a vector quantization function according to the fifth embodiment of the present invention.

FIG. 9 shows a functional block for realizing a vector quantization algorithm to be executed in the LPC analyzing section 600. The vector quantization block shown in FIG. 9 comprises a target extracting section 702, a quantizing section 703, a distortion calculator 704, a comparator 705, a decoding vector storing section 707, and a vector smoothing section 708.

In the target extracting section 702, a quantization target is calculated based on an input vector 701. Here, a target extracting method will be specifically explained.

In this embodiment, the input "vector" comprises two kinds of vectors in all wherein one is a parameter vector obtained by analyzing a current frame and the other is a parameter vector obtained from a future frame in a like manner. The target extracting section 702 calculates a quantization target using the above input vector and a decoded vector of the previous frame stored in the decoded vector storing section 707. An example of the calculation method will be shown by the following expression (8).

$$X(i)=\{S_t(i)+p(d(i)+S_{t+1}(i)/2\}/(1+p) \tag{8}$$

where X(i): target vector,
i: vector element number,
$S_t(i)$, $S_{t+1}(i)$: input vector,
t: time (frame number),
p: weighting coefficient (fixed), and
d(i): decoded vector of previous frame.

The following will show a concept of the above target extraction method. In a typical vector quantization, parameter vector $S_t(i)$ is used as target X(i) and a matching is performed by the following expression (9):

$$En = \sum_{i=0}^{I} (X(i) - Cn(i))^2 \tag{9}$$

where En: distance from n-th code vector,
X(i): target vector,
Cn(i): code vector,
n: code vector number,
i: order of vector, and
I: length of vector.

Therefore, in the conventional vector quantization, the coding distortion directly leads to degradation in speech quality. This was a big problem in the ultra-low bit rate coding in which the coding distortion cannot be avoided to some extent even if measurements such as prediction vector quantization is taken.

For this reason, according to this embodiment, attention should be paid to a middle point of the decoded vector as a direction where the user does not perceptually feel an error easily, and the decoded vector is induced to the middle point so as to realize perceptual improvement. In the above case, there is used a characteristic in which time continuity is not easily heard as a perceptual degradation.

Figure 10:
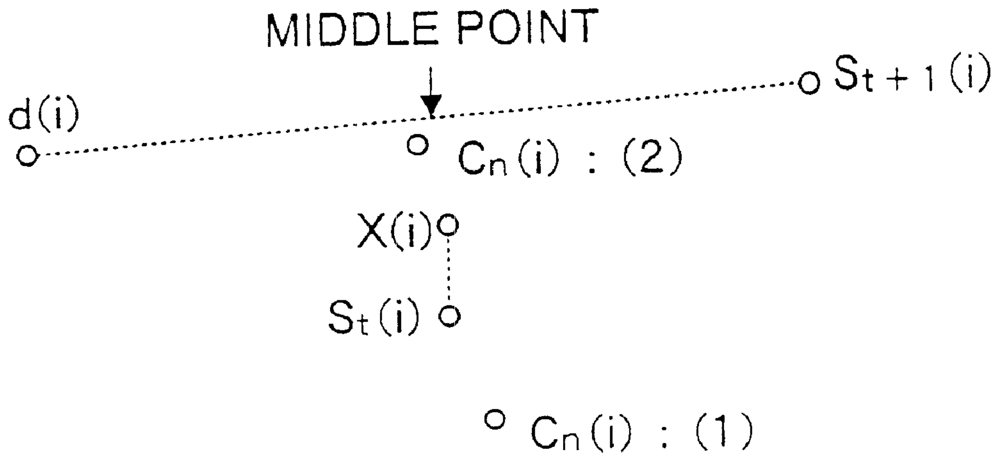
FIG. 10 is a view explaining an algorithm for a target extraction according to the fifth embodiment of the present invention.

The following will explain the above state with reference to FIG. 10 showing a vector space.

First of all, it is assumed that the decoded vector of one previous frame is d(i) and a future parameter vector is $S_{t+1}(i)$ (although a future coded vector is actually desirable, the future parameter vector is used for the future coded vector since the coding cannot be carried out in the current frame. In this case, although the code vector Cn(i): (1) is closer to the parameter vector St(i) than the code vector Cn(i): (2), the code vector Cn(i): (2) is actually close onto a line connecting d(i) and $S_{t+1}(i)$. For this reason, degradation is not easily heard as compared with (1). Therefore, by use of the above characteristic, if the target X(i) is set as a vector placed at the position where the target X(i) approaches to the middle point between d(i) and $S_{t+1}(i)$ from St(i) to some degree, the decoded vector is induced to a direction where the amount of distortion is perceptually slight.

Then, according to this embodiment, the movement of the target can be realized by introducing the following evaluation expression (10)

$$X(i)=\{S_t(i)+p(d(i)+S_{t+1}(i)/2\}/(1+p) \qquad (10)$$

where X(i): target vector,
  i: vector element number,
  $S_t(i)$, $S_{t+1}(i)$: input vector,
  t: time (frame number),
  p: weighting coefficient (fixed), and
  d(i): decoded vector of previous frame.

The first half of expression (10) is a general evaluation expression, and the second half is a perceptual component. In order to carry out the quantization by the above evaluation expression, the evaluation expression is differentiated with respect to each X(i) and the differentiated result is set to 0, so that expression (8) can be obtained.

Note that the weighting coefficient p is a positive constant. Specifically, when the weighting coefficient p is zero, the result is similar to the general quantization when the weighting coefficient p is infinite, the target is placed at the completely middle point. If the weighting coefficient p is too large, the target is largely separated from the parameter $S_t(i)$ of the current frame so that articulation is perceptually reduced. The test listening of decoded speech confirms that a good performance with $0.5<p<1.0$ can be obtained.

Next, in the quantizing section 703, the quantization target obtained by the target extracting section 702 is quantized so as to obtain a vector code and a decoded vector, and the obtained vector index and decoded vector are sent to the distortion calculator 704.

Note that a predictive vector quantization is used as a quantization method in this embodiment. The following will explain the predictive vector quantization.

Figure 11:
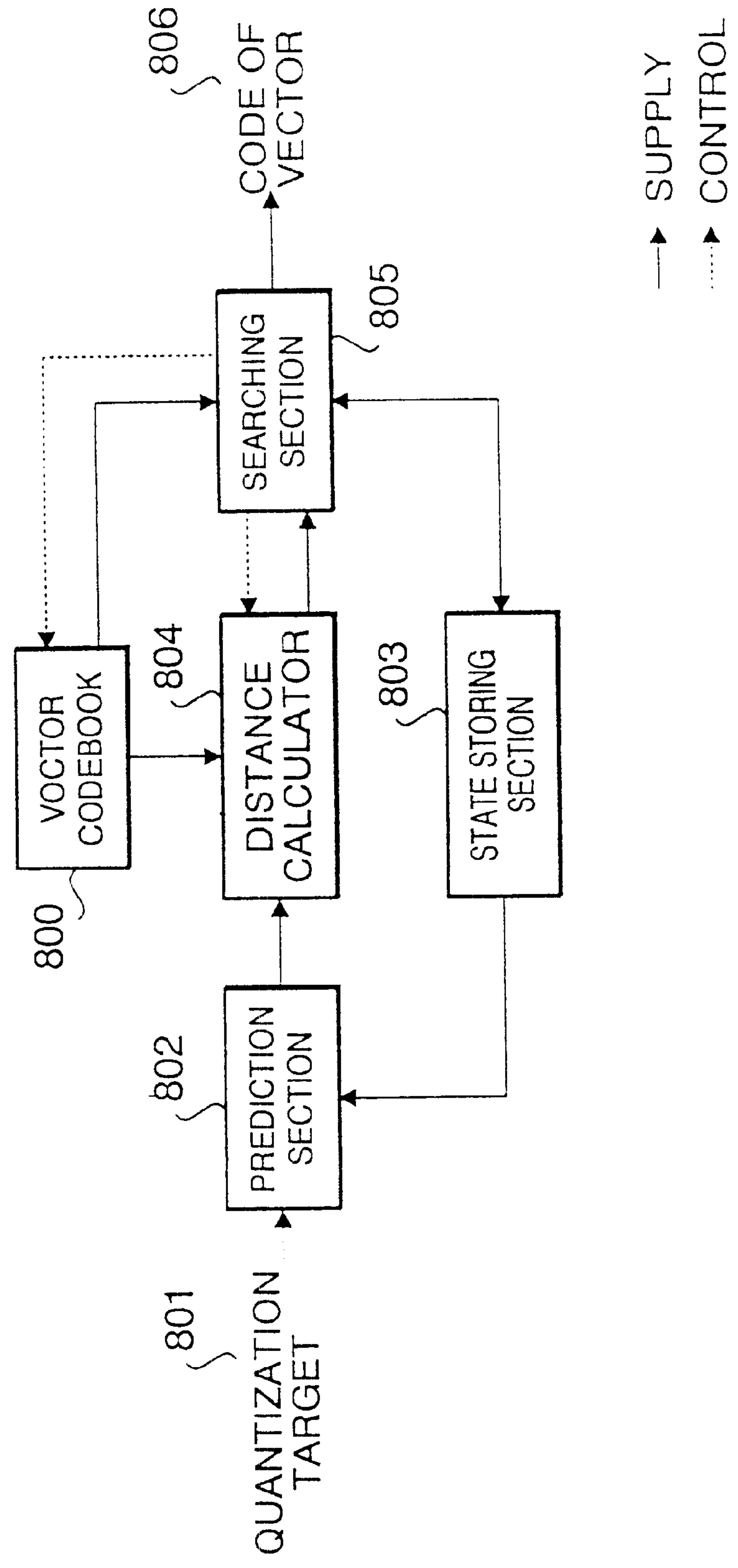
FIG. 11 is a functional block diagram of a predictive quantization according to the fifth embodiment of the present invention.

FIG. 11 shows a functional block of the predictive vector quantization. The predictive vector quantization is an algorithm in which the prediction is carried out using the vector (synthesized vector) obtained by coding and decoding in the past and the predictive error vector is quantized.

A vector codebook 800, which stores a plurality of main samples (codevectors) of the prediction error vectors, is prepared in advance. This is prepared by an LBG algorithm (IEEE TRANSACTIONS ON COMMUNICATIONS, VOL. COM-28, NO. 1, PP84–95, JANUARY 1980) based on a large number of vectors obtained by analyzing a large amount of speech data.

A vector 801 for quantization target is predicted by a prediction section 802. The prediction is carried out by the post-decoded vectors stored in a state storing section 803, and the obtained predictive error vector is sent to a distance calculator 804. Here, as a form of prediction, a first prediction order and a fixed coefficient are used. Then, an expression for calculating the predictive error vector in the case of using the above prediction is shown by the following expression (11).

$$Y(i)=X(i)-\beta D(i) \qquad (11)$$

where Y(i): predictive error vector,
  X(i): target vector,
  β: prediction coefficient (scalar)
  D(i): decoded vector of one previous frame, and
  i: vector order.

In the above expression, it is general that the prediction coefficient β is a value of $0<\beta<1$.

Next, the distance calculator 804 calculates the distance between the predictive error vector obtained by the prediction section 802 and the codevector stored in codebook 800. An expression for obtaining the above distance is shown by the following expression (12):

$$En=\sum_{i=0}^{I}(T(i)-Cn(i))^2 \qquad (12)$$

where En: distance from n-th code vector,
  Y(i): predictive error vector,
  Cn(i): codevector,
  n: codervector number,
  I: vector order, and
  I: vector length.

Next, in a searching section 805, the distances for respective codevectors are compared, and the index of codevector which gives the shortest distance is output as a vector code 806.

In other words, the vector codebook 800 and the distance calculator 804 are controlled so as to obtain the index of codevector which gives the shortest distance from all codevectors stored in the vector codebook 800, and the obtained index is used as vector code 806.

Moreover, the vector is coded using the code vector obtained from the vector codebook 800 and the past-decoded vector stored in the state storing section 803 based on the final coding, and the content of the state storing section 803 is updated using the obtained synthesized vector. Therefore, the decoded vector here is used in the prediction when a next quantization is performed.

The decoding of the example (first prediction order, fixed coefficient) in the above-mentioned prediction form is performed by the following expression (13):

$$Z(i)=CN(i)+\beta D(i) \qquad (13)$$

where Z(i): decoded vector (used as D(i) at a next coding time,
  N: code for vector, CN(i): code vector, β: prediction coefficient (scalar), D(i): decoded vector of one previous frame, and i: vector order.

On the other hand, in a decoder, the code vector is obtained based on the code of the transmitted vector so as to be decoded. In the decoder, the same vector codebook and state storing section as those of the coder are prepared in advance. Then, the decoding is carried out by the same algorithm as the decoding function of the searching section in the aforementioned coding algorithm. The above is the vector quantization, which is executed in the quantizing section 703.

Next, the distortion calculator 704 calculates a perceptual weighted coding distortion from the decoded vector obtained by the quantizing section 703, the input vector 701, and the decoded vector of the previous frame stored in the decoded vector storing section 707. An expression for calculation is shown by the following expression (14):

$$Ew=\Sigma(V(i)-S_t(i)^2+p\{V(i)-(d(i)+S_{t+1}(i)/2\}^2 \quad (14)$$

where Ew: weighted coding distortion, $S_t$(i), $S_{t+1}$(i): input vector, t: time (frame number)

i: vector element number,

V(i): decoded vector, p: weighting coefficient (fixed), and d(i): decoded vector of previous frame.

In expression (14), the weighting efficient p is the same as the coefficient of the expression of the target used in the target extracting section 702. Then, the value of the weighted coding distortion, the encoded vector and the code of the vector are sent to the comparator 705.

The comparator 705 sends the code of the vector sent from the distortion calculator 704 to the transmission path 608, and further updates the content of the decoded vector storing section 707 using the vector sent from the distortion calculator 704.

According to the above-mentioned embodiment, in the target extracting section 702, the target vector is corrected from $S_t$(i) to the vector placed at the position approaching to the middle point between D(i) and $S_{t+1}$(i) to same extent. This makes it possible to perform the weighted search so as not to arise perceptual degradation.

The above explained the case in which the present invention was applied to the low bit rate speech coding technique used in such as a cellular phone. However, the present invention can be employed in not only the speech coding but also the vector quantization for a parameter having a relatively good interpolation in a music coder and an image coder.

In general, the LPC coding executed by the LPC analyzing section in the above-mentioned algorithm, conversion to parameters vector such as LPS (Line Spectram Pairs), which are easily coded, is commonly performed, and vector quantization (VQ) is carried out by Euclidean distance or weighted Euclidean distance.

Also, according to the above embodiment, the target extracting section 702 sends the input vector 701 to the vector smoothing section 708 after being subjected to the control of the comparator 705. Then, the target extracting section 702 receives the input vector changed by the vector smoothing section 708, thereby re-extracting the target.

In this case, the comparator 705 compares the value of weighted coding distortion sent from the distortion calculator 704 with a reference value prepared in the comparator. Processing is divided into two, depending on the comparison result.

If the comparison result is under the reference value, the comparator 705 sends the index of the codevector sent from the distortion calculator to the transmission path 608, and updates the content of the decoded vector storing section 707 using the coded vector sent from the distortion calculator 704. This update is carried out by rewriting the content of the decoded vector storing section 707 using the obtained coded vector. Then, processing moves to one for a next frame parameter coding.

While, if the comparison result is more than the reference value, the comparator 705 controls the vector smoothing section 708 and adds a change to the input vector so that the target extracting section 702, the quantizing section 703 and distortion calculator 704 are functioned again to perform coding again.

In the comparator 705, coding processing is repeated until the comparison result reaches the value under reference value. However, there is a case in which the comparison result can not reache the value under the reference value even if coding processing is repeated many times. In case, the comparator 705 provides a counter in its interior, and the counter counts the number of times wherein the comparison result is determined as being more than the reference value. When the number of times is more than a fixed number of times, the comparator 705 stops the repetition of coding and clears the comparison result and counter state, then adopts initial index.

The vector smoothing section 708 is subjected to the control of the comparator 705 and changes parameter vector $S_t$(i) of the current frame, which is one of input vectors, from the input vector obtained by the target extracting section 702 and the decoded vector of the previous frame obtained decoded vector storing section 707 by the following expression (15), and sends the changed input vector to the target extracting section 702.

$$S_t(i)\leftarrow(1-q)\cdot S_t(i)+q(d(\mathrm{i})+S_{t+1}(i))/2 \quad (15)$$

In the above expression, q is a smoothing coefficient, which shows the degree of which the parameter vector of the current frame is updated close to a middle point between the decoded vector of the previous frame and the parameter vector of the future frame. The coding experiment shows that good performance can be obtained when the upper limitation of the number of repetition executed by the interior of the comparator 705 is 5 to 8 under the condition of $0.2<q<0.4$.

Although the above embodiment uses the predictive vector quantization in the quantizing section 703, there is a high possibility that the weighted coding distortion obtained by the distortion calculator 704 will become small. This is because the quantized target is updated closer to the decoded vector of the previous frame by smoothing. Therefore, by the repetition of decoding the previous frame due to the control of the comparator 705, the possibility that the comparison result will become under the reference value is increased in the distortion comparison of the comparator 705.

Also, in the decoder, there is prepared a decoding section corresponding to the quantizing section of the coder in advance such that decoding is carried out based on the index of the codevector transmitted through the transmission path.

Also, the embodiment of the present invention was applied to quantization (quantizing section is prediction VQ) of LSP parameter appearing CELP speech coder, and speech coding and decoding experiment was performed. As a result, it was confirmed that not only the subjective quality but also the objective value (S/N value) could be improved. This is because there is an effect in which the coding distortion of predictive VQ can be suppressed by coding repetition processing having vector smoothing even when the spectrum drastically changes. Since the future prediction VQ was predicted from the past-decoded vectors, there was a disadvantage in which the spectral distortion of the portion where the spectrum drastically changes such as a speech onset contrarily increased. However, in the application of the embodiment of the present invention, since smoothing is carried out until the distortion lessens in the case where the distortion is large, the coding distortion becomes small though the target is more or less separated from the actual parameter vector. Whereby, there can be obtained an effect in which degradation caused when decoding the speech is totally reduced. Therefore, according to the embodiment of the present invention, not only the subjuctive quality but also the objective value can be improved.

In the above-mentioned embodiment of the present invention, by the characteristics of the comparator and the vector smoothing section, control can be provided to the direction where the operator does not perceptually feel the direction of degradation in the case where the vector quantizing distortion is large. Also, in the case where predictive vector quantization is used in the quantizing section, smoothing and coding are repeated until the coding distortion lessens, thereby the objective value can be also improved.

The above explained the case in which the present invention was applied to the low bit rate speech coding technique used in such as a cellular phone. However, the present invention can be employed in not only the speech coding but also the vector quantization for a parameter having a relatively good interpolation in a music coder and an image coder.

Sixth Embodiment

Next, the following will explain the CELP speech coder according to the sixth embodiment. The configuration of this embodiment is the same as that of the fifth embodiment excepting quantization algorithm of the quantizing section using a multi-stage predictive vector quantization as a quantizing method. In other words, the excitation vector generator of the first embodiment is used as a random codebook. Here, the quantization algorithm of the quantizing section will be specifically explained.

Figure 12:
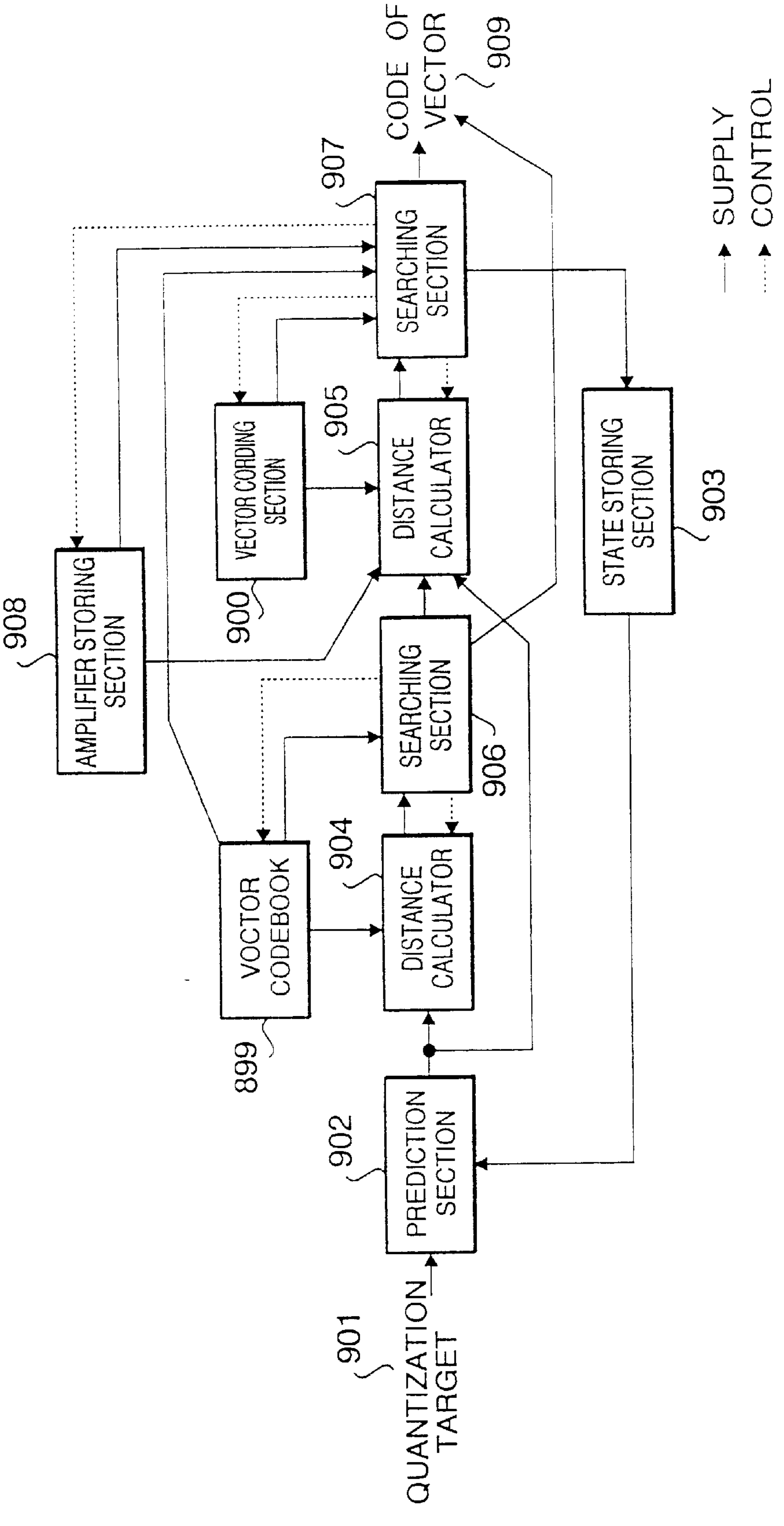
FIG. 12 is a functional block diagram of a predictive quantization according to a sixth embodiment of the present invention.

FIG. 12 shows the functional block of the quantizing section. In the multi-stage predictive vector quantization, the vector quantization of the target is carried out, thereafter the vector is decoded using a codebook with the index of the quantized target, a difference between the coded vector. Then, the original target (hereinafter referred to as coded distortion vector) is obtained, and the obtained coded distortion vector is further vector-quantized.

A vector codebook 899 in which a plurality of dominant samples (codevectors) of the predictive error vector are stored and a codebook 900 are generated in advance. These codevectors are generated by applying the same algorithm as that of the codevector generating method of the typical "multi-vector quantization". In other words, these codevectors are generally generated by an LBG algorithm (IEEE TRANSACTIONS ON COMMUNICATIONS, VOL. COM-28, NO. 1, PP84–95, JANUARY 1980) based on a large number of vectors obtained by analyzing many speech data. Note that, a training date for designing codevectors 899 is a set of many target vectors, while a training date for designing codebook 900 is a set of coded distortion vectors obtained when the above-quantized targets are coded by the vector codebook 899.

First, a vector 901 of the target vector is predicted by a predicting section 902. The prediction is carried out by the past-decoded vectors stored in a state storing section 903, and the obtained predictive error vector is sent to distance calculators 904 and 905.

According to the above embodiment, as a form of prediction, a fixed coefficient is used for a first order prediction. Then, an expression for calculating the predictive error vector in the case of using the above prediction is shown by the following expression (16).

$$Y(i)=X(i)-\beta D(i) \tag{16}$$

where Y(i): predictive error vector,

X(i): target vector,

β: predictive coefficient (scalar),

D(i): decoded vector of one previous frame, and i: vector order.

In the above expression, it is general that the predictive coefficient β is a value of 0<β<1.

Next, the distance calculator 904 calculates the distance between the predictive error vector obtained by the prediction section 902 and code vector A stored in the vector codebook 899. An expression for obtaining the above distance is shown by the following expression (17):

$$En=\sum_{i=0}^{I}(X(i)-C1n(i))^2 \tag{17}$$

where En: distance from n-th code vector A

Y(i): predictive error vector,

C1n(i): codevector A, n: index of codervector A,

I: vector order, and

I: vector length.

Then, in a searching section 906, the respective distances from the codevector A are compared, and the index of the code vector A having the shortest distance is used as a code for code vector A. In other words, the vector codebook 899 and the distance calculator 904 are controlled so as to obtain the code of codevector A having the shortest distance from all codevectors stored in the codebook 899. Then, the obtained code of codevector A is used as the index of codebook 899. After this, the code for codevector A and decoded vector A obtained from the codebook 899 with reference to the code for codevector A are sent to the distance calculator 905. Also, the code for codevector A is sent to a searching section 906 through the transmission path.

The distance calculator 905 obtains a coded distortion vector from the predictive error vector and the decoded vector A obtained from the searching section 906. Also, the distance calculator 905 obtains amplitude from an amplifier storing section 908 with reference to the code for codevector A obtained from the searching section 906. Then, the distance calculator 905 calculates a distance by multiplying the above coded distortion vector and codevector B stored in the vector codebook 900 by the above amplitude, and sends the obtained distance to the searching section 907. An expression for the above distance is shown as follows:

$$Z(i)=Y(i)-C1N(i)$$

$$Em = \sum_{i=0}^{I} (Z(i) - aNC2m(i))^2 \quad (18)$$

where Z(i): decoded vector,

Y(i): predictive error vector,

C1N(i): decoded vector A,

Em: distance from m-th code vector B, aN: amplitude corresponding to the code for codevector A, C2m(i): codevector B, m: index of codevector B, i: vector order, and I: vector length Then, in a searching section 907, the respective distances from the codevector B are compared, and the index of the codevector B having the shortest distance is used as a code for codevector B. In other words, the codebook 900 and the distance calculator 905 are controlled so as to obtain the code of codevector B having the shortest distance from all codevectors stored in the vector codebook 900. Then, the obtained code of codevector B is used as the index of codebook 900. After this, codevector A and codevector B are added and used as a vector code 909.

Moreover, the searching section 907 carries out the decoding of the vector using decoded vectors A, B obtained from the vector codebooks 899 and 900 based on the codes for codevector A and codevector B, amplitude obtained from an amplifier storing section 908 and past decoded vectors stored in the state storing section 903. The content of the state storing section 903 is updated using the obtained decoded vector. (Therefore, the vector as decoded above is used in the prediction at a next coding time). The decoding in the prediction (a first prediction order and a fixed coefficient) in this embodiment is performed by the following expression (19):

$$Z(i)=C1N(i)+aN \cdot C2M(i)+\beta D(i) \quad (19)$$

where Z(i): decoded vector (used as D(i) at the next coding time),

N: code for codevector A,

Mx: code for codevector B,

C1N(i): decoded codevector A,

C2M(i): decoded codevector B, aN: amplitude corresponding to the code for codevector A, β: predictive coefficient (scalar), D(i): decoded vector of one previous frame, and i: vector order.

Also, although amplitude stored in the amplifier storing section 908 is preset, the setting method is set forth below. The amplitude is set by coding much speech data is coded, obtaining the sum of the coded distortions of the following expression (20), and performing the training such that the obtained sum is minimized.

$$EN = \sum_t \sum_{i=0}^{I} (Y_t(i) - C1N(i) - aNC2m_t(i))^2 \quad (20)$$

where EN: coded distortion when the code for codevector A is N,

N: code for codevector A, t: time when the code for codevector A is $Y_t$(I): predictive error vector at time t, C1N(i) decoded codevector A, aN: amplitude corresponding to the code for codevector A, $C2m_t$(i): codevector B, i: vector order, and I: vector length.

In other words, after coding, amplitude is reset such that the value, which has been obtained by differentiating the distortion of the above expression (20) with respect to each amplitude, becomes zero, thereby performing the training of amplitude. Then, by the repetition of coding and training, the suitable value of each amplitude is obtained.

On the other hand, the decoder performs the decoding by obtaining the codevector based on the code of the vector transmitted. The decoder comprises the same vector codebooks (corresponding to codebooks A, B) as those of the coder, the amplifier storing section, and the state storing section. Then, the decoder carries out the decoding by the same algorithm as the decoding function of the searching section (corresponding to the codevector B) in the aforementioned coding algorithm.

Therefore, according to the above-mentioned embodiment, by the characteristics of the amplifier storing section and the distance calculator, the code vector of the second stage is applied to that of the first stage with a relatively small amount of calculations, thereby the coded distortion can be reduced.

The above explained the case in which the present invention was applied to the low bit rate speed coding technique used in such as a cellular phone. However, the present invention can be employed in not only the speech coding but also the vector quantization for a parameter having a relatively-good interpolation in a music coder and an image coder.

Seventh Embodiment

Next, the following will explain the CELP speech coder according to the sixth embodiment. This embodiment shows an example of a coder, which is capable of reducing the number of calculation steps for vector quantization processing for ACELP type random codebook.

Figure 13:
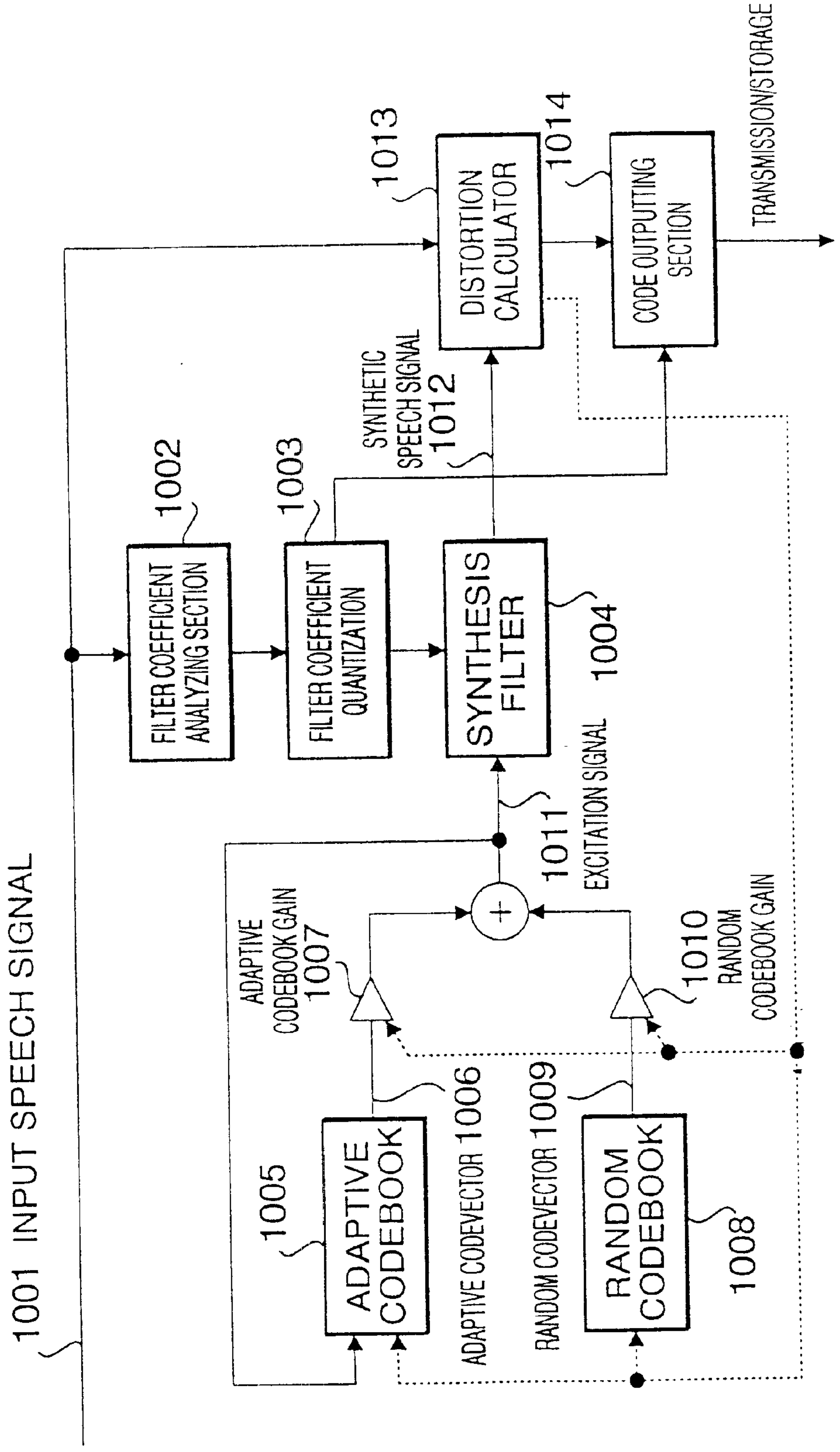
FIG. 13 is a functional block diagram of a CELP speech coder according to a seventh embodiment of the present invention.

FIG. 13 shows the functional block of the CELP speech coder according to this embodiment. In this CELP speech coder, a filter coefficient analysis section 1002 provides the linear predictive analysis to input speech signal 1001 so as to obtain coefficients of the synthesis filter, and outputs the obtained coefficients of the synthesis filter to a filter coefficient quantization section 1003. The filter coefficient quantization section 1003 quantizes the input coefficients of the synthesis filter and outputs the quantized coefficients to a synthesis filter 1004.

The synthesis filter 1004 is constituted by the filter coefficients supplied from the filter coefficient quantization section 1003. The synthesis filter 1004 is excited by an excitation signal 1011. The excitation signal 1011 is obtained by adding a signal, which is obtained by multiplying an adaptive codevector 1006, i.e., an output from an adaptive codebook 1005, by an adaptive codebook gain 1007, and a signal, which is obtained by multiplying a random codevector 1009, i.e., an output from a random codebook 1008, by a random codebook gain 1010.

Here, the adaptive codebook 1005 is one that stores a plurality of adaptive codevectors, which extracts the past excitation signal for exciting the synthesis filter every pitch cycle. The random codebook 1007 is one that stores a plurality of random codevectors. The random codebook 1007 can use the excitation vector generator of the aforementioned first embodiment.

A distortion calculator 1013 calculates a distortion between a synthetic speech signal 1012, i.e., the output of the synthesis filter 1004 excited by the excitation signal 1011, and the input speech signal 1001 so as to carry out code search processing. The code search processing is one that specifies the index of the adaptive codevector 1006 for minimizing the distortion calculated by the distortion calculator 1013 and that of the random gain 1009. At the same time, the code search processing is one that calculates optimum values of the adaptive codebook gain 1007 and the random codebook gain 1010 by which the respective output vectors are multiplied.

A code output section 1014 outputs the quantized value of the filter coefficients obtainable from the filter coefficient quantization section 1003, the index of the adaptive codevector 1006 selected by the distortion calculator 1013 and that of the random codevector 1009, and the quantized values of adaptive codebook gain 1007 and random codebook gain 1009 by which the respective output vectors are multiplied. The outputs from the code output section 1014 are transmitted or stored.

In the code search processing in the distortion calculator 1013, an adaptive codebook component of the excitation signal is first searched, and a codebook component of the excitation signal is next searched.

The above search of the random codebook component uses an orthogonal search set forth below.

The orthogonal search specifies a random vector c, which maximizes a search reference value Eort (=Nort/Dort) of expression (21).

$$Eort\left(=\frac{Nort}{Dort}\right)=\frac{[\{(P^tH^tHc)x-(x^tHp)Hp\}Hc]^2}{(c^tH^tHc)(p^tH^tHp)-(p^tH^tHc)^2} \tag{21}$$

where Nort: numerator term for Eort,
Dort: denominator term for Eort,
p: adaptive codevector already specified,
H: synthesis filter coefficient matrix,
$H^t$: transposed matrix for H,
X: target signal (one that is obtained by differentiating a zero input response of the synthesis filter from the input speech signal), and
c: random codevector.

The orthogonal search is a search method for orthogonalizing random codevectors serving as candidates with respect to the adaptive vector specified in advance so as to specify index that minimizes the distortion from the plurality of orthogonalized random codevectors. The orthogonal search has the characteristics in which a accuracy for the random codebook search can be improved as compared with a non-orthogonal search and the quality of the synthetic speech can be improved.

In the ACELP type speech coder, the random codevector is constituted by a few signed pulses. By use of the above characteristic, the numerator term (Nort) of the search reference value shown in expression (21) is deformed to the following expression (22) so as to reduce the number of calculation steps on the numerator term.

$$Nort=\{a_0\psi(l_0)+a_1\psi(l_1)+\ldots+a_{n-1}\psi(l_{n-1})\}^2 \tag{22}$$

where $a_i$: sign of i-th pulse (+1/−1),
$l_i$: position of i-th pulse,
N: number of pulses, and
φ: $\{(p^tH^tHp)x-(x^tHp)Hp\}H$.

If the value of φ expression (22) is calculated in advance as a pre-processing and expanded to an array, (N−1) elements out of array φ are added or substituted, and the resultant is squared, whereby the numerator term of expression (21) can be calculated.

Next, the following will specifically explain the distortion calculator 1013, which is capable of reducing the number of calculation steps on the denominator term.

Figure 14:
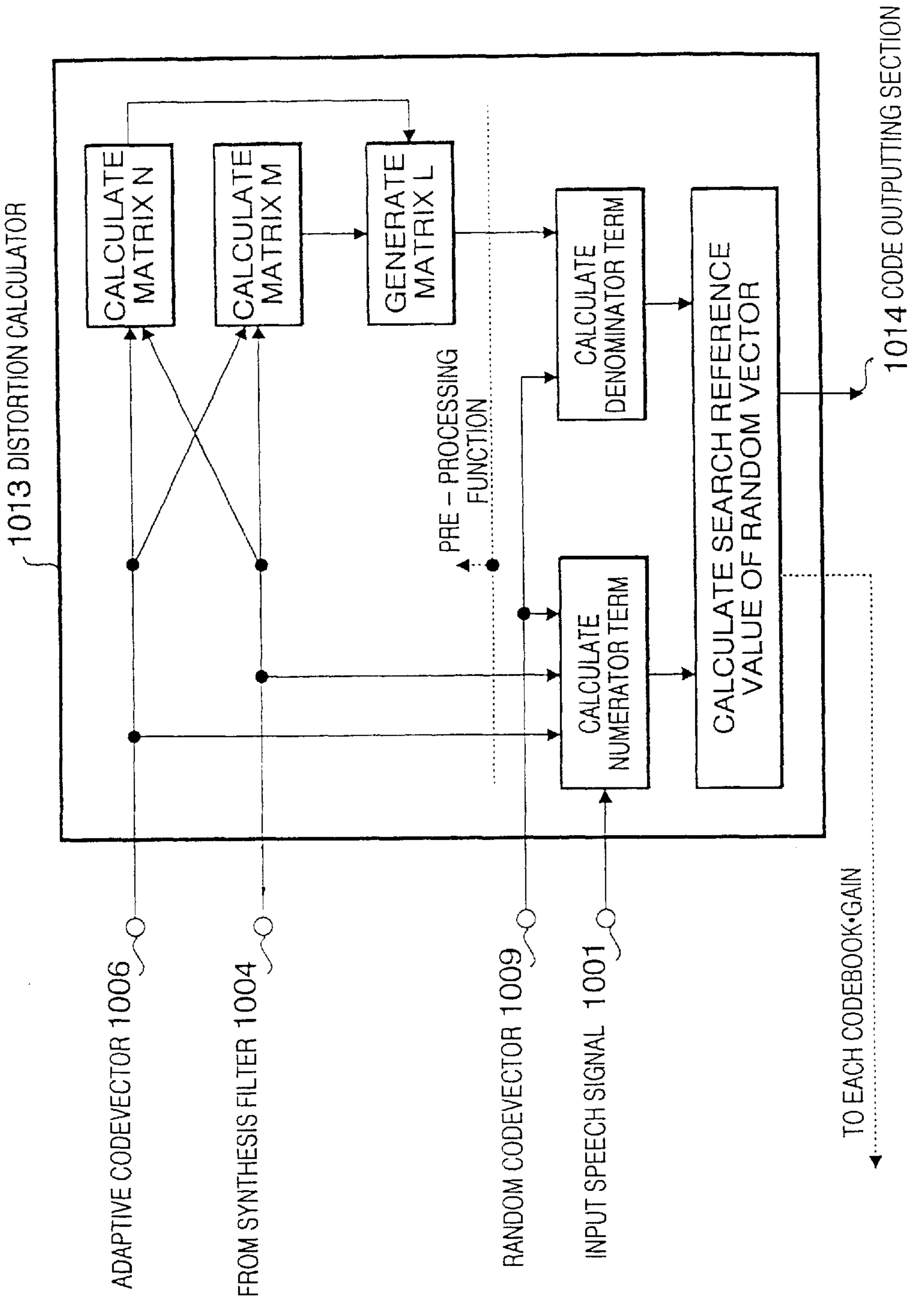
FIG. 14 is a functional block diagram of a distortion calculator according to the seventh embodiment of the present invention.

FIG. 14 shows the functional block of the distortion calculator 1013. The speech coder of this embodiment has the configuration in which the adaptive codevector 1006 and the random codevector 1009 in the configuration of FIG. 13 are input to the distortion calculator 1013.

In FIG. 14, the following three processing is carried out as pre-processing at the time of calculating the distortion for each random codevector.

(1) Calculation of first matrix (N): power of synthesized adaptive codevector ($p^tH^tHp$) and self-correlation matrix of synthesis filter's coefficients ($H^tH$) are computed, and each element of the self-correlation matrix are multiplied by the above power so as to calculate matrix N (=$(p^tH^tHp)H^tH$).

(2) Calculate second matrix (M): time reverse synthesis is performed to the synthesized adaptive codevector for producing ($p^tH^tH$), and outer products of the above resultant signal ($p^tH^tH$) is calculated for producing matrix M.

(3) Generate third matrix (L): matrix M calculated in item (2) is subtracted from matrix N calculated in item (1) so as to generate matrix L.

Also, the denominator term (Dort) of expression (21) can be expanded as in the following expressions (23).

$$\begin{aligned}Dort&=(c^tH^tHc)(p^tH^tHp)-(p^tH^tHc)^2\\&=c^tNc-(r^tc)^2\\&=c^tNc-(r^tc)^t(r^tc)\\&=c^tNc-(c^trr^tc)\\&=c^tNc-(c^tMc)\\&=c^t(N-M)c\\&=c^tLc\end{aligned} \tag{23}$$

| | | |
|---|---|---|
| where N: | $(p^tH^tHp)H^tH$ | the above pre-processing (1), |
| r: | $p^tH^tH$ | the above pre-processing (2), |
| M: | $rr^t$ | the above pre-processing (2), |
| L: | N-M | the above pre-processing (3), |
| C: | random codevector | |

Thereby, the calculation of the denominator term (Dort) at the time of the calculation of the search reference value (Eort) of expression (21) is replaced with expression (23), thereby making it possible to specify the random codebook component with the smaller amount of calculation.

The calculation of the denominator term is carried out using the matrix L obtained in the above pre-processing and the random codevector 1009.

Here, for simplifying the explanation, the calculation method of the denominator term will be explained on the basis of expression (23) in a case where a sampling frequency of the input speech signal is 8000 Hz, the random codebook has Algebraic structure, and its codevectors are constructed by five signed unit pulses per 10 ms frame.

The five signed unit pulses constituting the random vector have pulses each selected from the candidate positions defined for each of zero to fourth groups shown in Table 2, then random vector c can be described by the following expression (24).

$$C=a_0\delta(k-l_0)+a_1\delta(k-l_1)+ \ldots +a_4\delta(k-l_4) \quad (24)$$

(k=0, 1, . . . 79)

where $a_1$: sign (+1/−1) of pulse belonging to group i, and
$l_i$: position of pulse belonging to group i.

TABLE 2

| Group Number | Code | Pulse Candidate Position |
|---|---|---|
| 0 | ±1 | 0, 10, 20, 30, . . . , 60, 70 |
| 1 | ±1 | 2, 12, 22, 32, . . . , 62, 72 |
| 2 | ±1 | 2, 16, 26, 36, . . . , 66, 76 |
| 3 | ±1 | 4, 14, 24, 34, . . . , 64, 74 |
| 4 | ±1 | 8, 18, 28, 38, . . . , 68, 78 |

At this time, the denominator term (Dort) shown by expression (23) can be obtained by the following expression (25):

$$Dort = \sum_{i=0}^{4}\sum_{j=0}^{4} a_i a_j L(l_i, l_j) \quad (25)$$

where $a_1$: sign (+1/−1) of pulse belonging to group i,
$l_i$: position of pulse belonging to group i, and
$L(l_i, l_j)$: element ($l_i$ row and $l_j$ column) of matrix L.

As explained above, in the case where the ACELP type random codebook is used, the numerator term (Nort) of the code search reference value of expression (21) can be calculated by expression (22), while the denominator term (Dort) can be calculated by expression (25). Therefore, in the use of the ACELP type random codebook, the numerator term is calculated by expression (22) and the denominator term is calculated by expression (25), respectively, instead of directly calculating of the reference value of expression (21). This makes it possible to greatly reduce the number of calculation steps for vector quantization processing of random excitations.

The aforementioned embodiments explained the random code search with no pre-selection. However, the same effect as mentioned above can be obtained if the present invention is applied to a case in which pre-selection based on the values of expression (22) is employed, the values of expression (21) are calculated for only pre-selected random codevectors with expression (22) and expression (25), then finally selecting one random codevector, which maximize the above search reference value.

What is claimed is:

1. A dispersed vector generator used in an excitation vector generator for a speech coder/decoder comprising:

a pulse vector generating section that generates a pulse vector having a signed unit pulse on one element of a vector axis;

a dispersion pattern storing section that stores a plurality of dispersion patterns;

a switch that selects a dispersion pattern out of said plurality of dispersion patterns stored in said dispersion pattern storing section; and a pulse vector dispersion section that generates a dispersed vector by convoluting said selected dispersion pattern and said pulse vector.

2. The dispersed vector generator of claim 1, said excitation vector generator generating an excitation vector from N dispersed vectors based on the following expression:

$$c(n)=\Sigma ci(n)i+1$$

where c: excitation vector, ci: dispersed vector,

I: channel number (I=1~N), and n: vector element number (n=0–L−1: where L is an excitation vector length).

3. A CELP speech coder for coding speech signal comprising:

the dispersed vector generator described in claim 1;

a random codebook used to vector-quantize random excitation information;

a synthesis filter for generating a synthetic speech using an excitation vector output from said excitation vector generator as a random codevector;

a distortion calculator for calculating a quantization distortion caused between the generated synthetic speech and an input speech;

a system that changes a combination of a pulse position, a pulse polarity, and a dispersion pattern constituting a pulse vector; and a system that specifies the combination of the pulse position, the pulse polarity and the dispersion pattern such that the quantization distortion calculated by said distortion calculator is minimized so as to specify the index of random codebook.

4. The CELP speech coder according to claim 3, wherein the dispersion pattern is stored in storing means of said excitation vector generator, said dispersion pattern obtaining by pre-training to lessen the quantization distortions caused during vector quantization processing for random excitations.

5. The CELP speech coder according to claim 4, wherein the storing means of said excitation vector generator stores at least one kind of dispersion pattern obtained by training every channel.

6. The CELP speech coder according to claim 5, wherein when a value-of an ideal adaptive codebook gain, which has been calculated at the time of vector quantization processing for adaptive excitation, is larger than a preset threshold value, the dispersion pattern obtained by training is selected.

7. The CELP speech coder according to claim 5, wherein when a value of a decoded adaptive codebook gain is larger than a preset threshold value, the dispersion pattern obtained by training is selected.

8. The CELP speech coder according to claim 3, wherein at least one kind of dispersion pattern stored in the storing means of said excitation vector generator in every channel is a random pattern.

9. The CELP speech coder according to claim 3, wherein at least one kind of dispersion pattern stored in the storing means of said excitation vector generator in every channel is a dispersion pattern obtained by pre-training to lessen the quantization distortion caused during vector quantization processing for random excitations, and at least one kind thereof is a random pattern.

10. The CELP speech coder according to claim 9, wherein when a coding distortion caused when specifying the index of adaptive codebook is larger than a preset threshold value, a dispersion vector of the random pattern is selected.

11. The CELP speech coder according to claim 3, wherein a combination index showing a combination of the dispersion patterns selected by each channel is specified from all combinations $M^N$ of the dispersion patterns obtainable such that the quantization distortion caused during vector quantization processing for random excitation is minimized.

12. The CELP speech coder according to claim 11, wherein combinations of dispersion patterns are pre-selected using a speech parameter obtained in advance such that the quantization distortion caused during vector quantization processing for random excitation is minimized, and a combination index showing the combination of the dispersion patterns selected by each channel is specified from the pre-selected combinations of the dispersion patterns.

13. The CELP speech coder according to claim 12, wherein the combination of dispersion patterns to be pre-selected is changed in accordance with an analyzing result of a speech segment.

14. The CELP speech coder according to claim 3, further comprising:

target extracting means for calculating a parameter vector of a speech parameter obtained by analyzing a current coding frame, a parameter vector obtained by analyzing a future frame instead of the coding frame, and a quantization target vector using an encoded vector of a previous frame instead of the current coding frame; and vector-quantizing means for coding the calculated quantized target vector so as to obtain the index of random codebook for the current coding frame.

15. The CELP speech coder according to claim 14, wherein said target extracting means calculates the target vector based on the following expression:

$$X(i)=\{S_t(i)+p(d(i)+S_{t+1}(i)/2\}/(1+p)$$

where X(i): target vector, i: vector element number, $S_t(i)$, $S_{t+1}(i)$: parameter vectors, t: time (frame number), p: weighting coefficient (fixed), and d(i): decoded vector of previous frame.

16. The CELP speech coder according to claim 14, further comprising:

means for decoding the index of the current coding frame so as to generate a decoded codevector;

a second distortion calculator for calculating a coding distortion from said decoded vector and a parameter vector of said coding frame; and vector smoothing means for smoothing the parameter vector of the current coding frame to be supplied to said target extracting means when said coding distortion is less than a reference value.

17. The CELP speech coder according to claim 16, wherein said second distortion calculator calculates a perceptually weighted coding distortion based on the following expression:

$$Ew=\Sigma(V(i)-S_t(i)^2+p\{V(i)-(d(i)+S_{t+1}(i)/2\}^2$$

where Ew: perceptually weighted coding distortion, $S_t(i)$, $S_{t+1}(i)$: input vector, t: time (frame number)

i: vector element number,

V(i): decoded vector, p: weighting coefficient, and d(i): coded vector of previous frame.

18. The CELP speech coder according to claim 14, wherein said vector-quantizing means comprises:

a plurality of codebooks, provided to correspond to each stage of a multi-stage vector quantization, storing a plurality of codevectors;

means for calculating a distance between the target vector or its prediction error vector and a codevector stored in the codebook of the first stage so as to obtain a code of the first stage;

an amplifier storing section storing amplitude being expressed by an amount of scalar and corresponding to the codevector stored in the codebook of the first stage;

means for taking out amplitude depending on the code of the first stage from said amplifier storing section before a coding of a second stage is carried out so as to multiply the taken-out amplitude by a codevector of stored in the codebook of the second stage; and means for calculating a distortion between the decoded codevector decoded from the code of the first stage and the codevector by which the amplitude stored in the codebook of the second stage is multiplied so as to obtain an index of the second stage.

19. A communication apparatus comprising the CELP coder described in claim 3.

20. The CELP speech coder according to claim 3, wherein said CELP speech coder comprises an adaptive codebook storing an adaptive codevector expressing a pitch component of the input speech, and said distortion calculator comprises:

means for computing power of a signal obtained by synthesizing said adaptive codevector by said syntheis filter and a self-correlation matrix of a filter coefficients forming said synthesis filter so as to calculate a first matrix by multiplying each element of said self-correlation matrix by said power;

means for providing a time reverse synthesis to the signal obtained by synthesizing said adaptive vector by said synthetic filter so as to calculate a second matrix by taking an outer product of the signal to which the time reverse synthesis is provided; and means for generating a third matrix by subtracting said second matrix from said first matrix, thereby calculating the distortion.

21. A CELP speech decoder for decoding speech comprising:

a random codebook which has the dispersed vector generator described in claim 1, for selecting a dispersion pattern in accordance with a random code number specifying a combination index of dispersion patterns and a combination index of pulse vectors, and for generating pulse vectors; and a synthesis filter for generating a synthetic speech using an excitation vector output from said excitation vector generator as a random codevector.

22. The CELP speech decoder according to claim 21, wherein the dispersion pattern is stored in storing means of said excitation vector generator, said dispersion pattern obtaining by pre-training to lessen a quantization distortion caused during vector quantization processing for random excitations.

23. The CELP speech decoder according to claim 22, wherein the storing means of said excitation vector generator stores at least one kind of dispersion pattern obtained by training every channel.

24. The CELP speech decoder according to claim 21, wherein at least one kind of dispersion pattern stored in the storing means of said excitation vector generator in every channel is a random pattern.

25. The CELP speech decoder according to claim 21, wherein at least one kind of dispersion pattern stored in the storing means of said excitation vector generator in every channel is a dispersion pattern obtained by pre-training to lessen the quantization distortion caused when vector quantization processing for random excitations, and at least one kind thereof is a random pattern.

26. A communication apparatus comprising the CELP decoder described in claim 21.

27. A method for a CELP speech coding system comprising:

generating a random codevector for vector quantization processing of random excitation using the dispersed vector generator described in claim 1;

generating a synthetic speech using an excitation vector output from said excitation vector generator as a random codevector;

calculating a quantization distortion caused between the generated synthetic speech and an input speech;

changing a combination of pulse positions, pulse polarities, and a dispersion pattern constituting a pulse vector; and specifying the combination of the pulse position, the pulse polarity and the dispersion pattern such that the quantization distortion is minimized.

28. A method for decoding speech signal coded in a CELP system comprising:

generating a random code vector using the dispersed vector generator described in claim 1; and generating a synthetic speech using an excitation vector output from said excitation vector generator as a random codevector.

29. The dispersed vector generator of claim 1, wherein said pulse vector is generated from an algebraic codebook.

30. A method for vector quantization processing for an input vector for a speech coder/decoder comprising:

calculating a target vector from the input vector having a plurality of time-continuous vectors and past-decoded vectors;

coding said target vector to obtain a code and decoding said code to obtain a decoded vector;

calculating a distortion from the obtained decoded vector and said input vector;

specifying a code for minimizing said distortion;

storing the decoded vector;

updating the decoded vector by a decoded vector corresponding to a final code; and providing the speech coder/decoder with the updated decoded vector.

31. A method for generating an excitation vector for a speech coder/decoder comprising:

generating pulse vectors of N channels (N≧1);

selectively taking out a dispersion pattern from a storage system that stores M (M≧1) kinds of dispersion patterns for every channel in accordance with N channels;

performing a convolution using the extracted dispersion pattern and the generated pulse vectors for every channel so as to generate N dispersed vectors;

generating an excitation vector from the N dispersed vectors generated; and providing the speech coder/decoder with the excitation vector.

32. An excitation vector generator used for a speech coder/decoder comprising:

N dispersed vector generators that enables generation of N dispersed vectors; and an adding section that enables generation of an excitation vector by adding up said generated N dispersed vectors;

wherein said dispersed vector generator comprises:

a pulse vector generating section that generates a pulse vector having a signed unit pulse on one element of a vector axis;

a dispersion pattern storing section that stores a plurality of dispersion patterns;

a switch that selects a dispersion pattern out of said plurality of dispersion patterns stored in said dispersion pattern storing section; and a pulse vector dispersion section that generates a dispersed vector by convoluting said selected dispersion pattern and said pulse vector.

* * * * *

UNITED STATES PATENT AND TRADEMARK OFFICE

CERTIFICATE OF CORRECTION

PATENT NO. : 6,415,254 B1

DATED : July 2, 2002

INVENTOR(S) : K. Yasunaga et al.

It is certified that error appears in the above-identified patent and that said Letters Patent is hereby corrected as shown below:

<u>Column 29,</u>

Line 31, the expression "$X(i)=\{S_t(i)+p(d(i)+S_{t+1}(i)/2\}/(1+p)$" should be -- $X(i)=\{S_t(\mathrm{i})+p(d(\mathrm{i})+S_{t+1}(\mathrm{i}))/2\}/(1+p)$ --.

Line 53, the expression "$Ew=\Sigma(V(i)-S_t(i)^2+p\{V(i)-(d(i)+S_{t+1}(i)/2\}^2$" should be -- $Ew=\Sigma\{(V(i)-S_t(i))^2+p\{V(i)-(d(i)+S_{t+1}(i))/2\}^2\}$ --.

Signed and Sealed this

Twenty-first Day of October, 2003

JAMES E. ROGAN

*Director of the United States Patent and Trademark Office*